United States Patent
Hiramatsu

(10) Patent No.: US 12,316,138 B2
(45) Date of Patent: May 27, 2025

(54) POWER TRANSMISSION APPARATUS AND POWER RECEPTION APPARATUS

(71) Applicant: CANON KABUSHIKI KAISHA, Tokyo (JP)

(72) Inventor: Tomoki Hiramatsu, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 26 days.

(21) Appl. No.: 18/523,733

(22) Filed: Nov. 29, 2023

(65) Prior Publication Data
US 2024/0097503 A1  Mar. 21, 2024

Related U.S. Application Data

(63) Continuation of application No. PCT/JP2022/020582, filed on May 17, 2022.

(30) Foreign Application Priority Data

May 31, 2021 (JP) ................. 2021-091458

(51) Int. Cl.
- *H02J 50/60* (2016.01)
- *H02J 50/10* (2016.01)
- *H02J 50/80* (2016.01)

(52) U.S. Cl.
CPC .............. *H02J 50/60* (2016.02); *H02J 50/10* (2016.02); *H02J 50/80* (2016.02)

(58) Field of Classification Search
CPC .. H02J 50/60; H02J 50/10; H02J 50/80; H02J 7/00034; H02J 50/12
See application file for complete search history.

(56) References Cited

U.S. PATENT DOCUMENTS

| | | | | |
|---|---|---|---|---|
| 12,142,937 | B2* | 11/2024 | Hiramatsu | ............ H02J 50/80 |
| 2017/0040843 | A1* | 2/2017 | Asanuma | ............... H02J 50/12 |
| 2017/0093214 | A1* | 3/2017 | Watanabe | ............... H02J 50/60 |

(Continued)

FOREIGN PATENT DOCUMENTS

| | | |
|---|---|---|
| JP | 2017038509 A | 2/2017 |
| JP | 2017070074 A | 4/2017 |

(Continued)

*Primary Examiner* — Jared Fureman
*Assistant Examiner* — Michael J Warmflash
(74) *Attorney, Agent, or Firm* — Canon U.S.A., Inc. IP Division

(57) ABSTRACT

A power transmission apparatus wirelessly transmits power to a power reception apparatus, transmits a signal including information for use in identification of the presence probability of a foreign object to the power reception apparatus. In a case where the presence probability of the foreign object is smaller than a threshold, the power transmission apparatus transmits information for use in identification of the presence probability of the foreign object and information about a request for a process related to reacquisition of a parameter to be used to determine a presence probability of the foreign object, and in a case where the presence probability of the foreign object is greater than the threshold, the power transmission apparatus transmits information for use in identification of the presence probability of the foreign object without the information about a request for the process related to reacquisition of the parameter.

13 Claims, 11 Drawing Sheets

(56) References Cited

U.S. PATENT DOCUMENTS

| | | | |
|---|---|---|---|
| 2019/0074730 A1* | 3/2019 | Shahsavari | G01R 27/2688 |
| 2021/0091603 A1 | 3/2021 | Alpert et al. | |
| 2023/0015212 A1* | 1/2023 | Hiramatsu | H02J 50/60 |
| 2023/0104039 A1* | 4/2023 | Hiramatsu | H02J 50/80 |
| | | | 307/104 |
| 2023/0402880 A1* | 12/2023 | Hiramatsu | H02J 50/60 |
| 2024/0333041 A1* | 10/2024 | Tamura | H02J 50/80 |
| 2025/0038573 A1* | 1/2025 | Hiramatsu | H02J 50/80 |

FOREIGN PATENT DOCUMENTS

| | | |
|---|---|---|
| JP | 2020520225 A | 7/2020 |
| JP | 2021044939 A | 3/2021 |

\* cited by examiner

POWER TRANSMISSION APPARATUS AND POWER RECEPTION APPARATUS

CROSS-REFERENCE TO RELATED APPLICATIONS

This application is a Continuation of International Patent Application No. PCT/JP2022/020582, filed May 17, 2022, which claims the benefit of Japanese Patent Application No. 2021-091458, filed May 31, 2021, both of which are hereby incorporated by reference herein in their entireties.

BACKGROUND

Field

The present disclosure relates to a power transmission apparatus, a power reception apparatus, a wireless power transmission system, a control method for controlling a power transmission apparatus, a control method for controlling a power reception apparatus, and a program.

Background Art

The development of techniques for wireless power transmission systems have been widely conducted. Patent literature (PTL) 1 discusses a power transmission apparatus and a power reception apparatus compliant with a standard formulated by a wireless charging standards body called the Wireless Power Consortium (WPC) (the "WPC standard"). Patent literature (PTL) 2 discusses a method for foreign object detection in the WPC standard. A foreign object is an object different from a power reception apparatus. In the WPC standard, first, based on the difference between the transmission power of a power transmission apparatus and the reception power of a power reception apparatus, the power transmission apparatus calculates in advance the amount of power loss between the power transmission apparatus and the power reception apparatus in the state where the foreign object is not present. Then, the power transmission apparatus determines the calculated amount of power loss as the amount of power loss in a normal state during a power transmission process (the state where the foreign object is not present). After that, based on the amount of power loss between the power transmission apparatus and the power reception apparatus calculated while power is subsequently transmitted, the power transmission apparatus determines whether the foreign object is present.

CITATION LIST

Patent Literature

PTL 1: Japanese Patent Laid-Open No. 2015-56959
PTL 2: Japanese Patent Laid-Open No. 2017-70074

The above foreign object detection is performed by the power transmission apparatus. PTL 2, however, does not discuss a method in which the power transmission apparatus appropriately transmits foreign object detection information containing a presence probability of the foreign object to the power reception apparatus after performing the foreign object detection.

SUMMARY

The present disclosure is directed to enabling a power transmission apparatus to appropriately transmit information based on a presence probability of an object different from a power reception apparatus to the power reception apparatus.

A power transmission apparatus wirelessly transmits power to a power reception apparatus, acquires information about a parameter, determines a presence probability of a foreign object based on the acquired information, and transmits, to the power reception apparatus, first information about the presence probability of the foreign object and second information about a request for a process related to reacquisition of the parameter in a case where the presence probability of the foreign object is smaller than a threshold, and transmits, to the power reception apparatus, the first information without the second information in a case where the presence probability of the foreign object is greater than the threshold.

Further features of the present disclosure will become apparent from the following description of exemplary embodiments with reference to the attached drawings.

DESCRIPTION OF THE EMBODIMENTS

Figure 1:
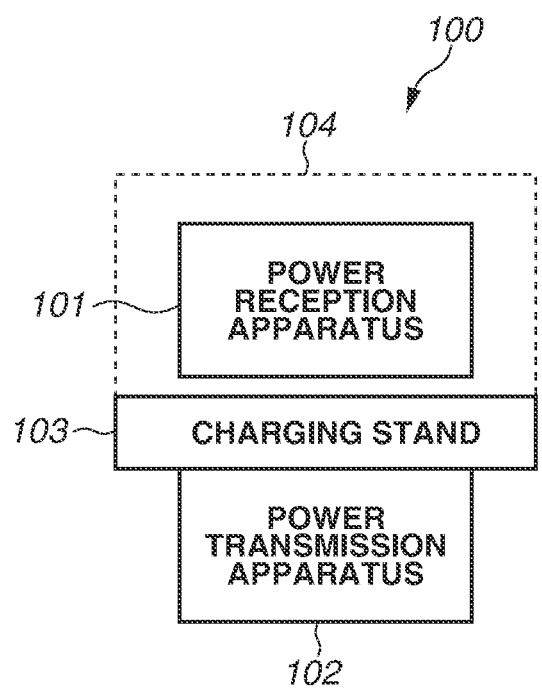
FIG. 1 is a diagram illustrating an example of a configuration of a wireless power transmission system.

Hereinafter, embodiments will be described in detail with reference to the drawings, and the following embodiments are not intended to limit the scope of the claims. Although features are described in the embodiments, not all of the features are essential, and the features may be combined in any manner. Furthermore, in the drawings, the same or similar components are denoted by the same reference numerals, and redundant description is omitted.
(Configuration of System)
FIG. 1 illustrates an example of a configuration of a wireless power transmission system 100 according to a first exemplary embodiment. The wireless power transmission system 100 is a contactless charging system. As an example, the wireless power transmission system 100 includes a power reception apparatus 101, a power transmission apparatus 102, and a charging stand 103. The power reception apparatus 101 is an electronic device that receives power from the power transmission apparatus 102 and charges a built-in battery. The power transmission apparatus 102 is an electronic device that wirelessly transmits power to the power reception apparatus 101 placed on the charging stand 103. A range 104 indicates the range where the power reception apparatus 101 is able to receive power transmitted from the power transmission apparatus 102. Each of the power reception apparatus 101 and the power transmission apparatus 102 can have a function of executing an application other than a contactless charging application. Examples of the power reception apparatus 101 include a smartphone. Examples of the power transmission apparatus 102 include an accessory device for charging the smartphone.

Each of the power reception apparatus 101 and the power transmission apparatus 102 can be a storage device, such as a hard disk device or a memory device, or can be an information processing apparatus, such as a personal computer (PC). Alternatively, each of the power reception apparatus 101 and the power transmission apparatus 102 can be an image input apparatus, such as an imaging apparatus (a camera or a video camera) or a scanner, or can be an image output apparatus, such as a printer, a copying machine, or a projector.

The wireless power transmission system 100 performs wireless power transmission using an electromagnetic induction method for contactless charging based on the Wireless Power Consortium (WPC) standard defined by the WPC. That is, the power transmission apparatus 102 and the power reception apparatus 101 perform wireless power transmission for contactless charging based on the WPC standard between a power transmission coil of the power transmission apparatus 102 and a power reception coil of the power reception apparatus 101. The wireless power transmission method (the contactless power transmission method) is not limited to a method defined by the WPC standard, and can be a different electromagnetic induction method, a magnetic field resonance method, an electric field resonance method, a microwave method, or a method using a laser. While the wireless power transmission is used for contactless charging in the present exemplary embodiment, the wireless power transmission can be performed for use other than contactless charging.

The WPC standard defines the guaranteed magnitude reception power of the power reception apparatus 101 receiving power from the power transmission apparatus 102, as a value termed guaranteed power (hereinafter referred to as "GP"). For example, the GP indicates the guaranteed power value of power that is output to a load in the power reception apparatus 101, such as a circuit, for charging the power reception apparatus 101 even in a case where a positional relationship between the power reception apparatus 101 and the power transmission apparatus 102 changes and the power transmission efficiency between the power reception coil and the power transmission coil decreases.

This power value is a power value agreed on between a power transmission apparatus and a power reception apparatus. For example, in a case where the GP is 15 watts, the power transmission apparatus 102 transmits power by performing control so that 15 watts is to be output to the load in the power reception apparatus 101 even in a case where a positional relationship between the power reception coil and the power transmission coil changes and the power transmission efficiency decreases. The WPC standard defines a technique that is performed by the power transmission apparatus 102 to detect existence of an object (a foreign object) other than the power reception apparatus 101 around the power transmission apparatus 102 (near a power reception antenna). The WPC standard defines a method for detecting the foreign object based on a change in the quality factor (Q factor) of a power transmission antenna (the power transmission coil) of the power transmission apparatus 102, and a power loss technique for detecting the foreign object based on the difference between the transmission power of the power transmission apparatus 102 and the reception power of the power reception apparatus 101. The foreign object detection based on the Q factor is performed before power transmission (in a negotiation phase or a renegotiation phase). The foreign object detection based on the power loss technique is performed during power transmission (the transmission of power) (in a power transfer phase) based on data obtained by calibration described below.

The details will be described below. Among indispensable metal components included in the power reception apparatus 101 (a product in which the power reception apparatus 101 is incorporated) or the power transmission apparatus 102 (a product in which the power transmission apparatus 102 is incorporated), there are metal components that may generate unintended heat in a case where the metal components are exposed to wireless power transmitted from the power transmission coil. Examples of the metal components include a metal frame on the periphery of the power transmission coil or the power reception coil. Examples of the foreign object according to the present exemplary embodiment include any object except for the above metal component among the metals that may generate heat in a case where the metals are exposed to wireless power transmitted from the power transmission coil. For example, the foreign object is a clip or an integrated circuit (IC) card.

The power transmission apparatus 102 and the power reception apparatus 101 according to the present exemplary embodiment perform communication for power transmission/reception control based on the WPC standard and communication for device authentication. The communication for power transmission/reception control based on the WPC standard is described.

The WPC standard defines a plurality of phases including the power transfer phase where power transmission is executed, and phases before actual power transmission is performed. In each phase, required communication for power transmission/reception control is performed. The phases before power transmission include the selection phase, the ping phase, the identification and configuration phase, the negotiation phase, and the calibration phase. Hereinafter, the identification and configuration phase will be referred to as the I & C phase. In the selection phase, the power transmission apparatus 102 intermittently transmits an analog ping and detects that an object is present in a power transmittable range (e.g., the power reception apparatus 101 or a conductor piece is placed on the charging stand 103). In the ping phase, the power transmission apparatus 102 transmits a digital ping having power greater than that of the analog ping. The magnitude of the digital ping is sufficient power for a control unit of the power reception apparatus 101 placed on the power transmission apparatus 102 to start. The power reception apparatus 101 notifies the power transmission apparatus 102 of the magnitude of a power reception voltage using a signal strength packet. As described above, the power transmission apparatus 102 receives a response from the power reception apparatus 101 having received the digital ping, whereby the power transmission apparatus 102 recognizes that the object detected in the selection phase is the power reception apparatus 101.

In a case where the power transmission apparatus 102 receives the notification of the power reception voltage, the power transmission apparatus 102 transitions to the I & C phase. The power transmission apparatus 102 measures the Q factor of the power transmission antenna (the power transmission coil) before transmitting the digital ping. This measurement result is used to execute the foreign object detection process using the Q factor measurement method. In the I & C phase, the power transmission apparatus 102 identifies the power reception apparatus 101 and acquires device configuration information (capability information) from the power reception apparatus 101. To this end, the power reception apparatus 101 transmits an identification (ID) packet and a configuration packet to the power transmission apparatus 102. The ID packet contains identifier information regarding the power reception apparatus 101, and the configuration packet contains device configuration information (capability information) regarding the power reception apparatus 101. The power transmission apparatus 102 having received the ID packet and the configuration packet responds to the power reception apparatus 101 with an acknowledgement (ACK, a positive response). Then, the I & C phase ends.

In the negotiation phase, based on the value of the GP requested by the power reception apparatus 101 and the power transmission capability of the power transmission apparatus 102, the value of the GP is determined. According to a request from the power reception apparatus 101, the power transmission apparatus 102 executes the foreign object detection process using the Q factor measurement method. The WPC standard defines a method for performing processes similar to those in the negotiation phase again after transition to the power transfer phase once, according to a request from the power reception apparatus 101. The phase after transition from the power transfer phase and in which these processes are performed is referred to as the renegotiation phase.

In the calibration phase, based on the WPC standard, the power reception apparatus 101 notifies the power transmission apparatus 102 of predetermined reception power values (a reception power value in a light load state and a reception power value in a maximum load state) and performs adjustment to cause the power transmission apparatus 102 to efficiently transmit power. The reception power values of which the power transmission apparatus 102 is notified are used for the foreign object detection process based on the power loss technique. In the power transfer phase, the power transmission apparatus 102 performs control for continuing transmission of power and stopping transmission of power due to an error or full charge.

The power transmission apparatus 102 and the power reception apparatus 101 perform this communication for power transmission/reception control through in-band communication for superimposing a signal based on the WPC standard and using the same antennas (coils) as those in the wireless power transmission. The range where the power transmission apparatus 102 and the power reception apparatus 101 are able to perform the in-band communication based on the WPC standard with each other is almost similar to the power transmittable range. That is, in FIG. 1, the range 104 indicates the range where the wireless power transmission and the in-band communication are able to be performed between the power transmission coil of the power transmission apparatus 102 and the power reception coil of the power reception apparatus 101. In the following description, that the power reception apparatus 101 "is placed" means a state where the power reception apparatus 101 enters the inside of the range 104, which even includes a state where the power reception apparatus 101 is not actually placed on the charging stand 103.

Figure 11:
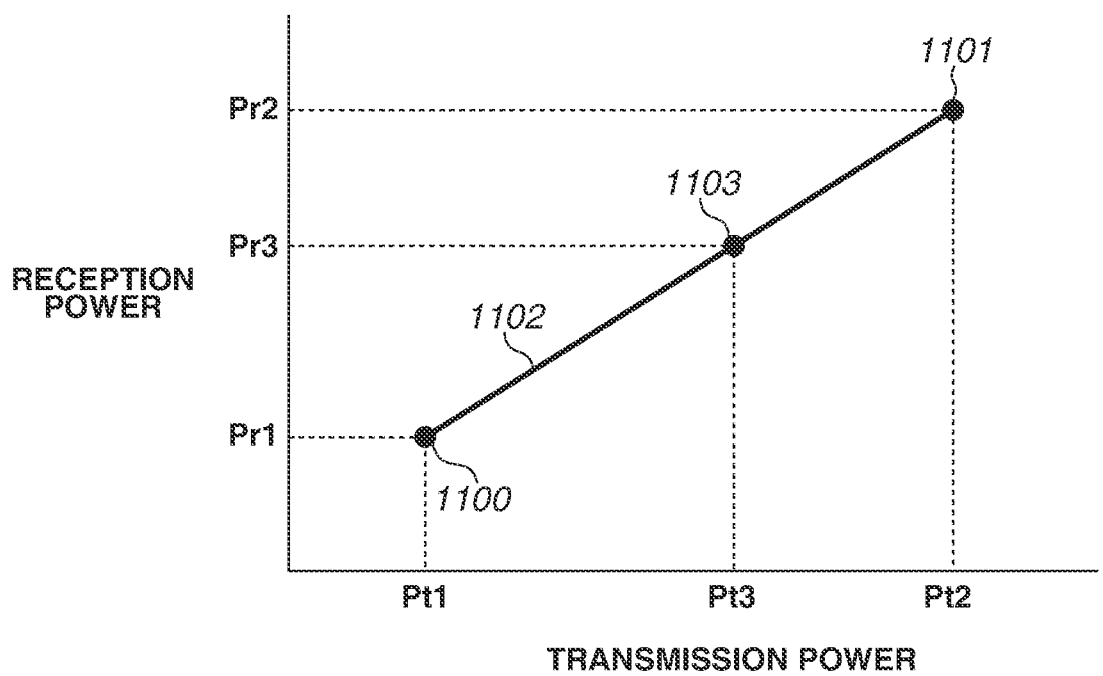
FIG. 11 is a diagram illustrating a foreign object detection method based on a power loss technique.

With reference to FIG. 11, the foreign object detection method based on the power loss technique defined by the WPC standard is described. The horizontal axis in FIG. 11 represents the transmission power of the power transmission apparatus 102, and the vertical axis in FIG. 11 represents the reception power of the power reception apparatus 101. First, the power transmission apparatus 102 transmits power with a digital ping to the power reception apparatus 101. The power transmission apparatus 102 receives a reception power value Pr1 (referred to as a "light load") of the power received by the power reception apparatus 101 as a received power packet (a mode 1) from the power reception apparatus 101. At the reception, the power reception apparatus 101 does not supply the received power to the load (a charging circuit and a battery). Then, the power transmission apparatus 102 stores the reception power value Pr1 and a transmission power value Pt1 at the reception as a point 1100 in FIG. 11. In this process, the power transmission apparatus 102 is able to recognize that the amount of power loss between the power transmission apparatus 102 and the power reception apparatus 101 when the power having the transmission power value Pt1 is transmitted is Pt1−Pr1 (=Ploss1).

Next, the power transmission apparatus 102 receives the value of a reception power value Pr2 (referred to as a "connected load") of the power received by the power reception apparatus 101 as a received power packet (a mode 2) from the power reception apparatus 101. In the reception, the power reception apparatus 101 supplies the received power to the load. Then, the power transmission apparatus 102 stores the reception power value Pr2 and a transmission power value Pt2 at the reception as a point 1101 in FIG. 11. In this process, the power transmission apparatus 102 is able to recognize that the amount of power loss between the power transmission apparatus 102 and the power reception apparatus 101 when the power having the transmission power value Pt2 is transmitted is Pt2−Pr2 (=Ploss2).

The power transmission apparatus 102 linearly interpolates the points 1100 and 1101 in FIG. 11 to create a straight line 1102. The straight line 1102 indicates the relationship between the transmission power value and the reception power value in the state where the foreign object is not present on the periphery of the power transmission apparatus 102 and the power reception apparatus 101. Thus, based on the transmission power value and the straight line 1102, the power transmission apparatus 102 is able to predict the reception power value in the state with a high possibility that the foreign object is not present. For example, if the transmission power value is Pt3, then based on a point 1103 on the straight line 1102 where the transmission power value indicates Pt3, the power transmission apparatus 102 is able to predict that the reception power value is Pr3.

A description will be given of a case in which the power transmission apparatus 102 receives a reception power value Pr3' from the power reception apparatus 101 when the power transmission apparatus 102 transmits power having the transmission power value Pt3 to the power reception apparatus 101. The power transmission apparatus 102 calculates a value Pr3−Pr3' (=Ploss_FO) obtained by subtracting the reception power value Pr3' actually received from the power reception apparatus 101 from the reception power value Pr3 in the state where the foreign object is not present. This Ploss_FO may be regarded as power loss that would be consumed by the foreign object if the foreign object is present between the power transmission apparatus 102 and the power reception apparatus 101. Thus, in a case where the power Ploss_FO that would be consumed by the foreign object exceeds a threshold determined in advance, the power transmission apparatus 102 determines that the foreign object is present.

Alternatively, the power transmission apparatus 102 obtains in advance the amount of power loss Pt3−Pr3 (=Ploss3) between the power transmission apparatus 102 and the power reception apparatus 101 from the reception power value Pr3 in the state where the foreign object is not present. Next, based on the reception power value Pr3' of the power received by the power reception apparatus 101 in the state where the foreign object is present, the power transmission apparatus 102 obtains the amount of power loss Pt3−Pr3' (=Ploss3') between the power transmission apparatus 102 and the power reception apparatus 101 in the state where the foreign object is present. Then, the power transmission apparatus 102 obtains Ploss3'−Ploss3 (=Ploss_FO) as the power Ploss_FO that would be consumed by the foreign object.

As described above, as a method for obtaining the power Ploss_FO that would be consumed by the foreign object, the power transmission apparatus 102 may obtain the power Ploss_FO as Pr3−Pr3' (=Ploss_FO), or may obtain the power Ploss_FO as Ploss3' Ploss3 (=Ploss_FO).

After acquiring the straight line 1102, the power transmission apparatus 102 periodically receives a reception power value (e.g., Pr3') of the currently received power from the power reception apparatus 101. The reception power value of the currently received power periodically transmitted from the power reception apparatus 101 is transmitted as a received power packet (a mode 0) to the power transmission apparatus 102. The power transmission apparatus 102 performs the foreign object detection based on the reception power value stored in the received power packet (the mode 0) and the straight line 1102. This is the description of the foreign object detection based on the power loss technique.

In the present exemplary embodiment, each of the points 1100 and 1101 for use in acquiring the straight line 1102 indicating the relationship between the transmission power value and the reception power value in the state where the foreign object is not present on the periphery of the power transmission apparatus 102 and the power reception apparatus 101 is referred to as a calibration data point. A line segment acquired by interpolating at least two calibration data points (the straight line 1102) is referred to as a calibration curve.

(Configurations of Apparatuses)

Next, the configurations of the power transmission apparatus 102 and the power reception apparatus 101 according to the present exemplary embodiment are described. The configurations described below are merely examples, and part (or all in some cases) of the described configurations can be replaced with another configuration that serves another similar function, or can be omitted, and a further configuration can be added to the described configurations. Further, a single block illustrated in the following description can be divided into a plurality of blocks, or a plurality of blocks can be integrated into a single block.

Figure 2:
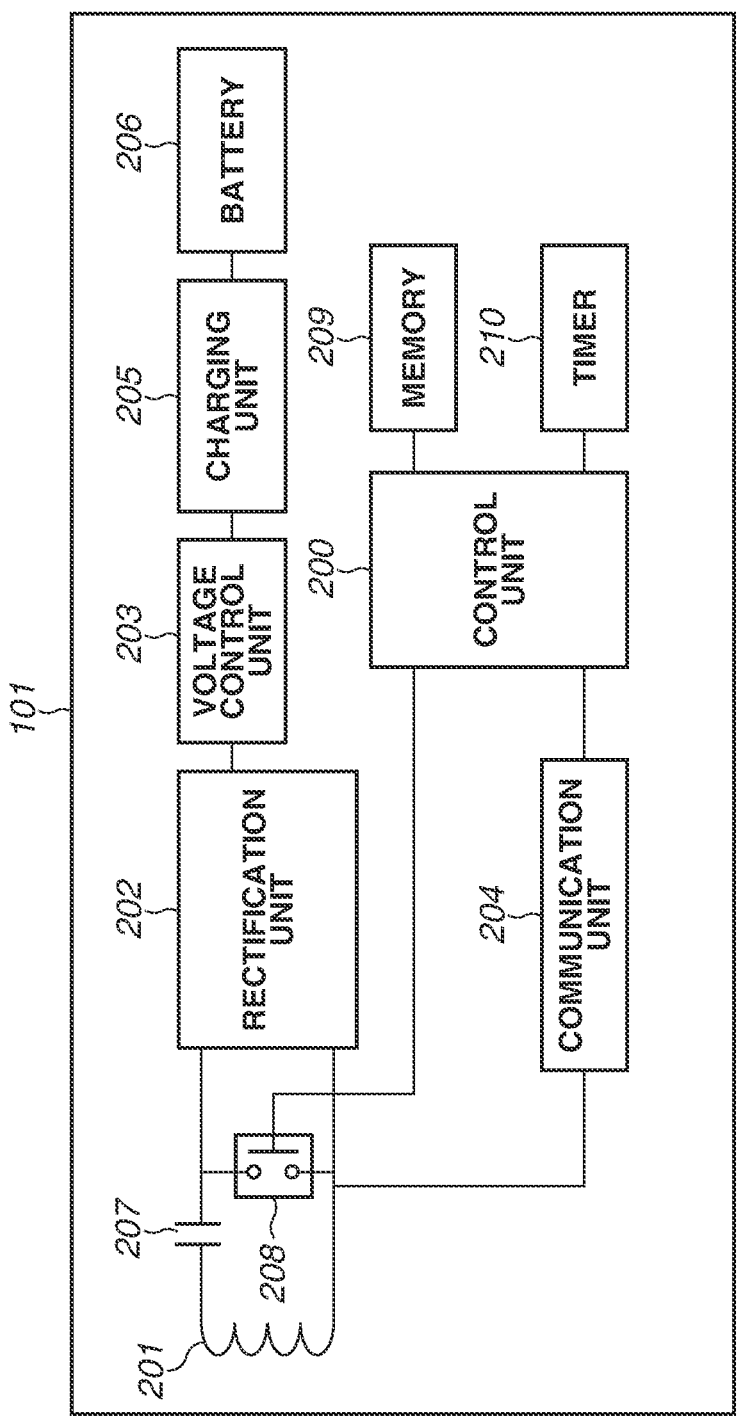
FIG. 2 is a block diagram illustrating an example of a configuration of a power reception apparatus.

FIG. 2 is a diagram illustrating an example of the configuration of the power reception apparatus 101 according to the present exemplary embodiment. The power reception apparatus 101 is compliant with the WPC standard. As an example, the power reception apparatus 101 includes a control unit 200, a power reception coil 201, a rectification unit 202, a voltage control unit 203, a communication unit 204, a charging unit 205, a battery 206, a resonance capacitor 207, a switch 208, a memory 209, and a timer 210.

For example, the control unit 200 executes a control program stored in the memory 209 to control entire operations of the power reception apparatus 101. The control unit 200 can perform control to execute an application other than a wireless power transmission application. The control unit 200 includes one or more processors, such as a central processing unit (CPU) and a microprocessor unit (MPU). The control unit 200 can include hardware dedicated to a specific process, such as an application-specific integrated circuit (ASIC), or an array circuit, such as a field-programmable gate array (FPGA) compiled to execute a predetermined process. The control unit 200 stores, in the memory 209, information that should be stored during the execution of various processes. The control unit 200 also measures time using the timer 210.

The power reception coil 201 receives power from the power transmission coil of the power transmission apparatus 102. The power reception coil 201 is connected to the resonance capacitor 207 and resonates at a particular frequency F2. The rectification unit 202 converts an alternating-current voltage and an alternating current of the power received from the power transmission coil of the power transmission apparatus 102 via the power reception coil 201 into a direct-current voltage and a direct current, respectively. The voltage control unit 203 converts the level of the direct-current voltage input from the rectification unit 202 into the level of a direct-current voltage at which the control unit 200 and the charging unit 205 operate.

The communication unit 204 performs the above control communication based on the WPC standard with the power transmission apparatus 102 through in-band communication. The communication unit 204 demodulates an electromagnetic wave input from the power reception coil 201 to acquire information transmitted from the power transmission apparatus 102. The communication unit 204 also performs load modulation on the electromagnetic wave to superimpose information to be transmitted to the power transmission apparatus 102 on the electromagnetic wave, whereby the communication unit 204 performs communication with the power transmission apparatus 102. That is, communication from the communication unit 204 is performed with the information superimposed on transmission power transmitted from a power transmission coil 303 of the power transmission apparatus 102.

The charging unit 205 charges the battery 206, based on the direct-current voltage supplied from the voltage control unit 203. The battery 206 supplies power for control, power reception, and communication to the entirety of the power reception apparatus 101. Using the charging unit 205, the battery 206 stores the power received via the power reception coil 201.

The switch 208 is a switch for short-circuiting the power reception coil 201 and the resonance capacitor 207 and is controlled by the control unit 200. When the switch 208 is turned on, the power reception coil 201 and the resonance capacitor 207 form a series resonant circuit. In this state, a current flows through only the closed circuit of the power reception coil 201, the resonance capacitor 207, and the switch 208, and a current does not flow to the rectification unit 202 and the voltage control unit 203. When the switch 208 is turned off, a current flows through the rectification unit 202 and the voltage control unit 203 via the power reception coil 201 and the resonance capacitor 207.

As described above, the memory 209 stores various pieces of information. The memory 209 can store information obtained by a function unit different from the control unit 200. The timer 210 measures time using, for example, a count up timer that measures the time elapsed from the clock time when the count up timer is started, or a countdown timer that counts down from a set time.

Figure 3:
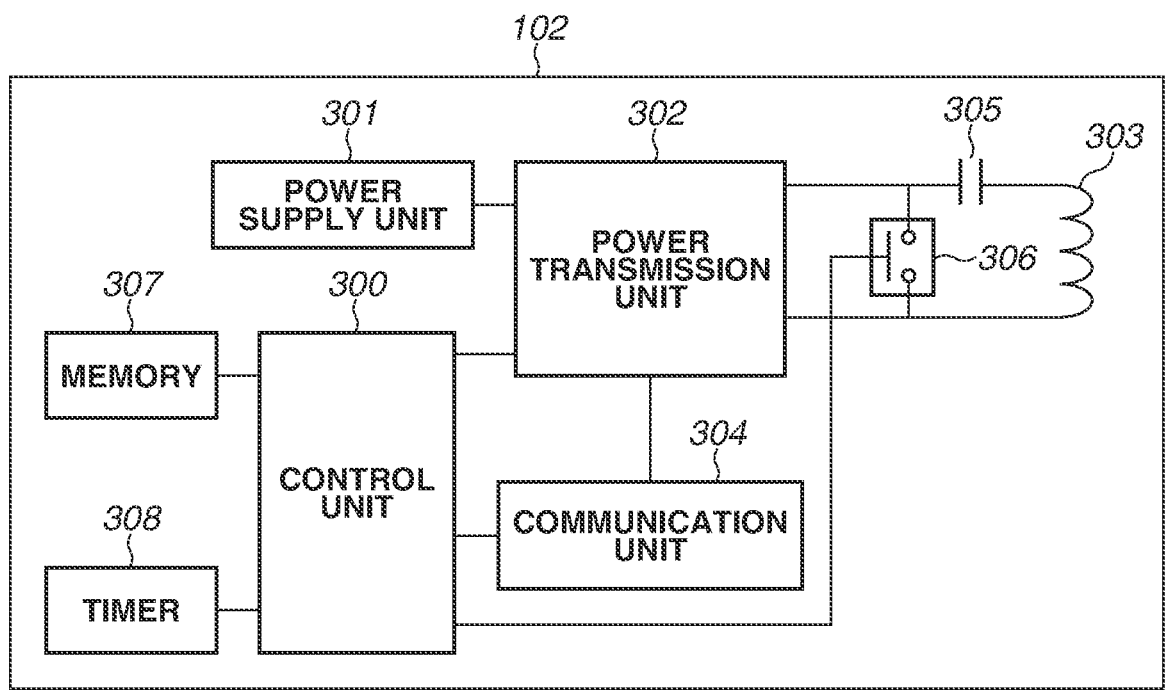
FIG. 3 is a block diagram illustrating an example of a hardware configuration of a power transmission apparatus.

FIG. 3 is a diagram illustrating an example of the hardware configuration of the power transmission apparatus 102 according to the present exemplary embodiment. As an example, the power transmission apparatus 102 includes a control unit 300, a power supply unit 301, the power transmission unit 302, a power transmission coil 303, a communication unit 304, a resonance capacitor 305, a switch 306, a memory 307, and a timer 308.

For example, the control unit 300 executes a control program stored in the memory 307 to control entire operations of the power transmission apparatus 102. The control unit 300 can perform control to execute an application other than a wireless power transmission application. The control unit 300 includes one or more processors, such as a CPU and an MPU. The control unit 300 can include hardware dedicated to a specific process, such as an ASIC, or an array circuit, such as an FPGA compiled to execute a predetermined process. The control unit 300 stores, in the memory 307, information that should be stored during the execution of various processes. The control unit 300 also measures time using the timer 308.

The power supply unit 301 supplies power for control, power transmission, and communication to the entirety of the power transmission apparatus 102. The power supply unit 301 is, for example, a commercial power supply or a battery. The power transmission unit 302 converts direct-current power or alternating-current power input from the power supply unit 301 into alternating-current frequency power in a frequency range for use in the wireless power transmission and inputs the alternating-current frequency power to the power transmission coil 303, to generate an electromagnetic wave for power to be received by the power reception apparatus 101. The frequency of the alternating-current power generated by the power transmission unit 302 is about several hundreds of kilohertz (e.g., 110 kHz to 205 kHz). Based on an instruction from the control unit 300, the power transmission unit 302 inputs the alternating-current frequency power to the power transmission coil 303 to cause the power transmission coil 303 to output an electromagnetic wave for power to be received by the power reception apparatus 101. The power transmission unit 302 also adjusts a voltage (a power transmission voltage) or a current (a power transmission current) to be input to the power transmission coil 303 to control the intensity of the electromagnetic wave to be output. In a case where the power transmission unit 302 increases the power transmission voltage or the power transmission current, the intensity of the electromagnetic wave strengthens. In a case where the power transmission unit 302 decreases the power transmission voltage or the power transmission current, the intensity of the electromagnetic wave weakens. Based on an instruction from the control unit 300, the power transmission unit 302 also controls the output of the alternating-current frequency power to start or stop the transmission of power from the power transmission coil 303. The power transmission coil 303 is connected to the resonance capacitor 305 and resonates at a particular frequency F1.

The communication unit 304 performs the above control communication based on the WPC standard with the power reception apparatus 101 through in-band communication. The communication unit 304 modulates an electromagnetic wave output from the power transmission coil 303 and transmits information to the power reception apparatus 101. The communication unit 304 demodulates an electromagnetic wave output from the power transmission coil 303 and modulated by the power reception apparatus 101 to acquire information transmitted from the power reception apparatus 101. That is, communication from the communication unit 304 is performed with the information superimposed on transmission power transmitted from the power transmission coil 303.

The switch 306 is a switch for short-circuiting the power transmission coil 303 and the resonance capacitor 305 and is controlled by the control unit 300. When the switch 306 is turned on, the power transmission coil 303 and the resonance capacitor 305 form a series resonant circuit. In this state, a current flows through only the closed circuit of the power transmission coil 303, the resonance capacitor 305, and the switch 306. When the switch 306 is turned off, power is supplied to the power transmission coil 303 and the resonance capacitor 305 from the power transmission unit 302.

As described above, the memory 307 stores various pieces of information. The memory 307 can store information obtained by a function unit different from the control unit 300. The timer 308 measures time using, for example, a count up timer that measures the time elapsed from the clock time when the count up timer is started, or a countdown timer that counts down from a set time.

Figure 4:
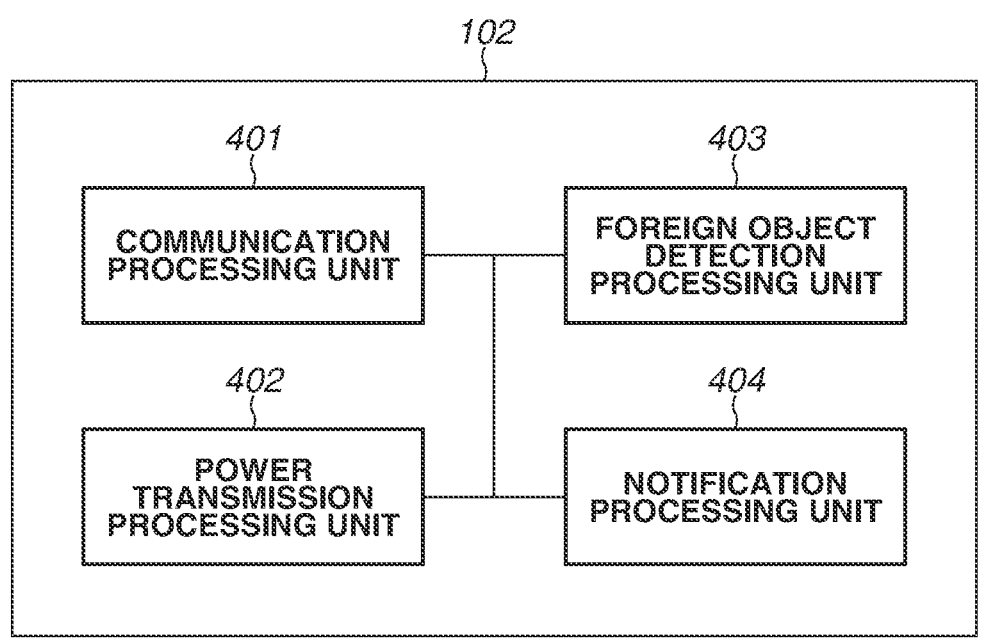
FIG. 4 is a block diagram illustrating an example of a functional configuration of the power transmission apparatus.

FIG. 4 is a block diagram illustrating an example of the functional configuration of the control unit 300 of the power transmission apparatus 102. As a processing unit that functions when the control unit 300 executes programs, the power transmission apparatus 102 includes a communication processing unit 401, a power transmission processing unit 402, a foreign object detection processing unit 403, and a notification processing unit 404.

The communication processing unit 401 is a processing unit that performs control communication with the power reception apparatus 101 based on the WPC standard via the communication unit 304. The power transmission processing unit 402 is a processing unit that controls the power transmission unit 302 to control the transmission of power to the power reception apparatus 101. The foreign object detection processing unit 403 is a processing unit that measures the power loss between the power transmission apparatus 102 and the power reception apparatus 101 and the Q factor of the power transmission coil 303, and detects the foreign object. The foreign object detection processing unit 403 can achieve a foreign object detection function based on the power loss technique and a foreign object detection function based on the Q factor measurement method. The foreign object detection processing unit 403 may also perform a foreign object detection process using another technique. For example, in the power transmission apparatus 102 having a near-field communication (NFC) communication function, the foreign object detection processing unit 403 may perform a foreign object detection process using an opposing device detection function based on the NFC standard. The foreign object detection processing unit 403 is also able to perform foreign object detection based on the Q factor measurement method in the time domain described below. Further, as a function other than the function of detecting the foreign object, the foreign object detection processing unit 403 is also able to detect a change in the state of the power transmission apparatus 102. For example, the foreign object detection processing unit 403 is able to detect an increase or decrease in the number of power reception apparatuses 101 on the power transmission apparatus 102. The foreign object detection processing unit 403 measures power output to the power reception apparatus 101 via the power transmission unit 302, and based on the difference between the average output power value calculated per unit time and the reception power value received from the power reception apparatus 101 via the communication processing unit 401, performs the foreign object detection process based on the power loss technique.

The notification processing unit 404 is a processing unit that notifies the power reception apparatus 101 of information regarding foreign object detection (hereinafter referred to as "foreign object detection information") via the communication processing unit 401. The foreign object detection information contains information about the presence probability of the foreign object that can be calculated based on an index derived by the foreign object detection processing unit 403. The present disclosure, however, is not limited to this. For example, the foreign object detection information can contain information about a request to start the foreign object detection process. In this case, the foreign object detection information can contain information about a request for re-execution or additional execution of calibration according to the presence probability of the foreign object, or can contain information about a request for a stop of the reception of power or a reduction of the reception power.

The functions of the communication processing unit 401, the power transmission processing unit 402, the foreign object detection processing unit 403, and the notification processing unit 404 are achieved by the control unit 300 executing programs. The processing units are able to function as independent programs and operate in parallel while synchronizing the programs by event processing.

(Procedure of Processing by Power Transmission Apparatus)

Figure 5:
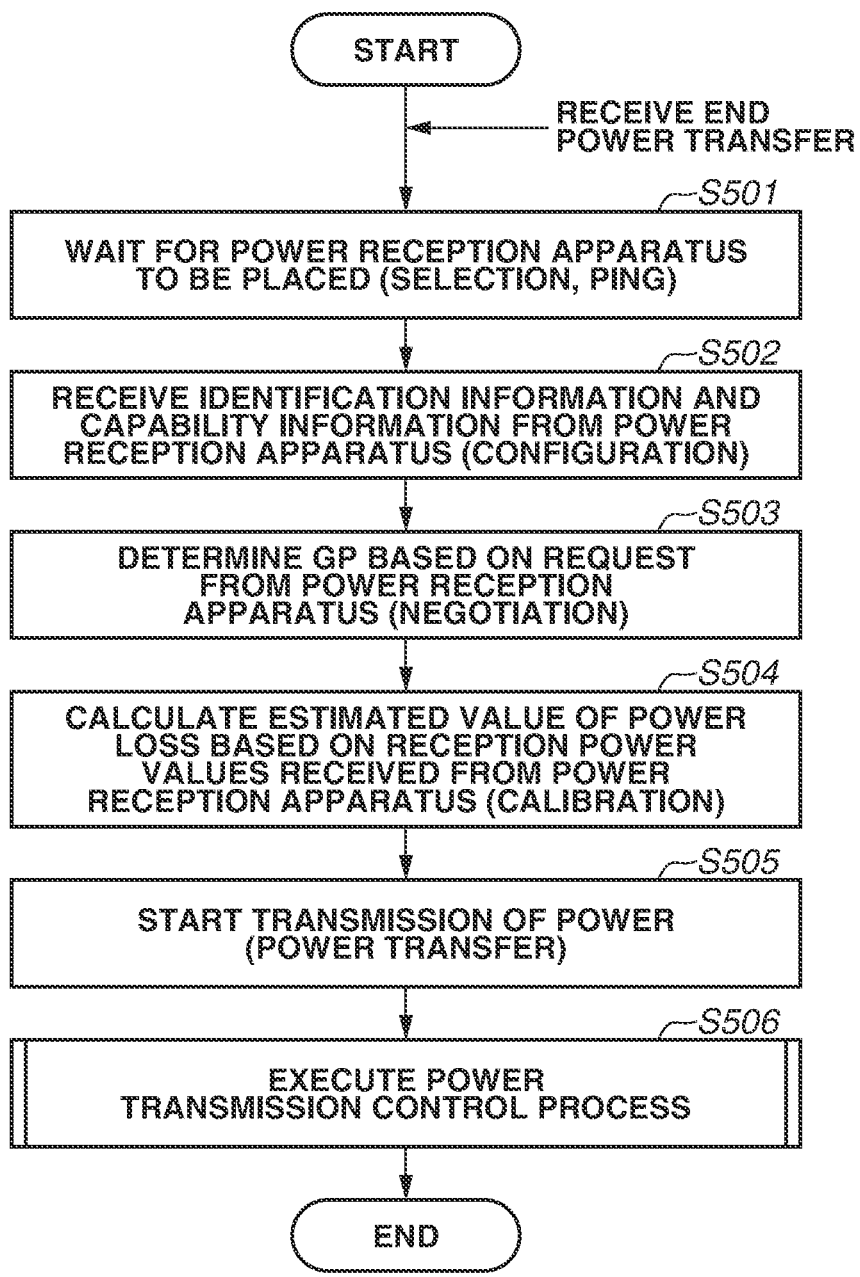
FIG. 5 is a flowchart of processing that is executed by the power transmission apparatus.

FIG. 5 is a flowchart illustrating a control method for controlling the power transmission apparatus 102. The processing in FIG. 5 is achieved by, for example, the control unit 300 of the power transmission apparatus 102 executing a program read from the memory 307. At least a part of the following processing may be achieved by hardware. The hardware in this case can be achieved by, for example, using a predetermined compiler to automatically generate a dedicated circuit that uses a gate array circuit, such as an FPGA, according to a program for achieving processing steps. The processing in FIG. 5 is executed in response to the power transmission apparatus 102 being powered on, or in response to a user of the power transmission apparatus 102 inputting an instruction to start the wireless power transmission application, or in response to power transmission apparatus 102 being connected to mains electricity and receiving the supply of power. Alternatively, the processing in FIG. 5 can be started using another trigger.

First, in step S501, the control unit 300 executes a process defined as the selection phase and the ping phase in the WPC standard and waits for an object to be placed on the power transmission apparatus 102. In these phases, the control unit 300 causes the power transmission unit 302 to repeatedly and intermittently transmit an analog ping in the WPC standard to detect an object present in the power transmittable range. In a case where the control unit 300 detects that an object is present in the power transmittable range, the control unit 300 causes the power transmission unit 302 to transmit a digital ping in the WPC standard. In a case where a predetermined response to the digital ping is received, the control unit 300 determines that the detected object is the power reception apparatus 101 and the power reception apparatus 101 is placed on the charging stand 103. Then, the processing proceeds to step S502.

In step S502, the control unit 300 receives identification information and capability information regarding the power reception apparatus 101 from the power reception apparatus 101 through communication in the configuration phase, defined by the WPC standard, performed by the communication unit 304. The identification information contains a manufacturer code and a basic device ID. The capability information contains information that allows the identification of the version of the WPC standard with which the power reception apparatus 101 is compatible, a maximum power value that is a value specifying the maximum power that the power reception apparatus 101 is able to supply to the load, and information indicating whether the power reception apparatus 101 has the negotiation function in the WPC standard. These pieces of information are merely examples. The identification information and the capability information regarding the power reception apparatus 101 can be replaced with other information, or other information can be contained in addition to the above information. For example, the identification information can be any other identification information that allows the identification of an individual power reception apparatus 101, such as a wireless power ID. Alternatively, the control unit 300 can acquire the identification information and the capability information regarding the power reception apparatus 101 using a method other than the communication in the configuration phase in the WPC standard.

Next, in step S503, the control unit 300 executes negotiation with the power reception apparatus 101 through communication in the negotiation phase defined by the WPC standard and determines the value of the GP. In step S503, the control unit 300 may execute not only the communication in the negotiation phase in the WPC standard, but also another procedure for determining the GP. In a case where the control unit 300 acquires information indicating that the power reception apparatus 101 is incompatible with the negotiation phase (e.g., in step S502), the control unit 300 may not perform the communication in the negotiation phase, and may determine the value of the GP as a defined small value. The defined small value is a value defined in advance by the WPC standard, for example.

In step S504, after determining the value of the GP, the control unit 300 executes the calibration phase based on the determined value of the GP. In the calibration phase, as described above with reference to FIG. 11, the control unit 300 derives the relationship of the reception power value to the transmission power value in the state where the foreign object is not present. Specifically, based on the WPC standard and using the predetermined reception power values acquired from the power reception apparatus 101, the control unit 300 derives data indicating the power loss between the power transmission apparatus 102 and the power reception apparatus 101 in the state where the foreign object is not present (data of the power loss). For example, the control unit 300 derives the straight line 1102 illustrated in FIG. 11. Examples of the predetermined reception power values include a reception power value in a light load state (a light load) and a reception power value in a maximum load state (a connected load).

The description of the foreign object detection based on the power loss technique is as described above. That is, in a case where the amount of power loss between the power transmission apparatus 102 and the power reception apparatus 101, calculated based on the calibration curve and the reception power value of the power reception apparatus 101 received during the transmission of power, during the transmission of power is greater than or equal to a predetermined threshold, the control unit 300 determines that "there is the foreign object". The foreign object detection is performed in step S604 in FIG. 6.

Next, in step S505, the control unit 300 starts transmission of power from the power transmission unit 302. The transmission of power is performed by a process in the power transfer phase. The present disclosure, however, is not limited to this, and the control unit 300 can transmit power using a method other than that in the WPC standard.

Next, in step S506, the control unit 300 executes a power transmission control process. The power transmission control process will be described below with reference to FIG. 6.

When the power transmission control process ends, the control unit 300 determines whether the power reception apparatus 101 is placed on the power transmission apparatus 102. In a case where the control unit 300 determines that the power reception apparatus 101 is not placed on the power transmission apparatus 102, the processing returns to the selection phase in step S501. In a case where the control unit 300 receives end power transfer in the WPC standard from the power reception apparatus 101, the control unit 300 ends the process in any processing phase according to the WPC standard and stops the transmission of power. Then, the processing returns to the selection phase in step S501. Even in a case where the power reception apparatus 101 is fully charged, end power transfer is also transmitted from the power reception apparatus 101 to the control unit 300. Thus, the processing returns to the selection phase in step S501.

Figure 6:
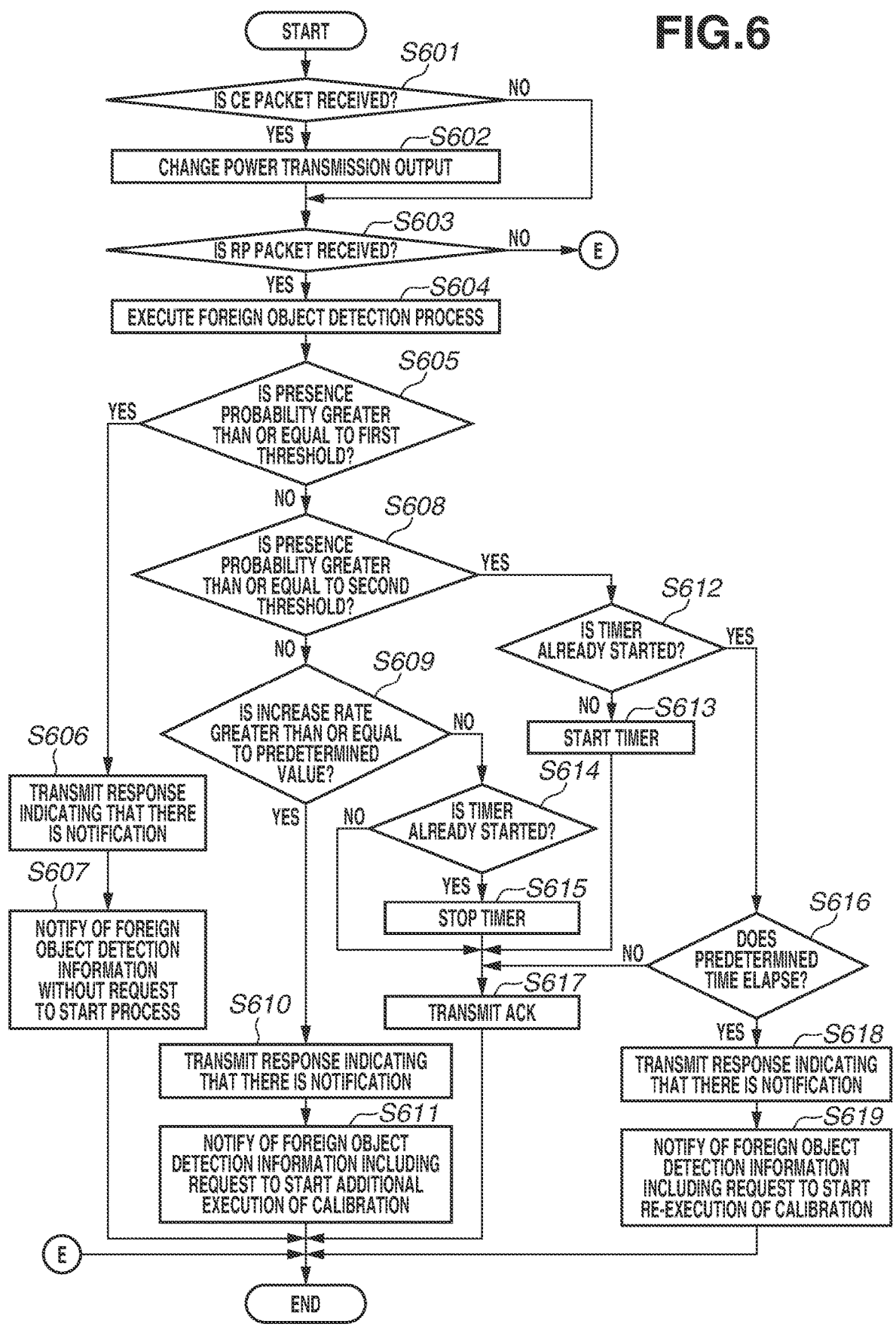
FIG. 6 is a flowchart of a power transmission control process that is executed by the power transmission apparatus.

FIG. 6 is a flowchart illustrating the details of the power transmission control process in step S506 in FIG. 5. The processing in FIG. 6 is achieved by, for example, the control unit 300 of the power transmission apparatus 102 executing a program read from the memory 307. At least a part of the following processing may be achieved by hardware. The hardware in this case can be achieved by, for example, using a predetermined compiler to automatically generate a dedicated circuit that uses a gate array circuit, such as an FPGA, according to a program for achieving processing steps.

In step S601, using the start of the processing as a trigger, the control unit 300 determines whether a control error packet (hereinafter referred to as a "CE packet") in the WPC standard is received from the power reception apparatus 101. The CE packet containing a control error value which is a value indicating the amount of change in the voltage serves as a message from the power reception apparatus 101 to instruct the power transmission apparatus 102 to change the power transmission output. The power transmission output is to be increased when the control error value is a positive value. The power transmission output is to be decreased when the control error value is a negative value. The power transmission output is not to be changed when the control error value is 0. In a case where the CE packet is received (YES in step S601), the processing proceeds to step S602. If the CE packet is not received (NO in step S601), the processing proceeds to step S603.

In step S602, the control unit 300 changes the power value of the power transmission output based on the amount of change indicated by the CE packet, and the processing proceeds to step S603.

In step S603, the control unit 300 determines whether a received power packet (hereinafter referred to as an "RP packet") in the WPC standard is received from the power reception apparatus 101. The RP packet serves as a message notifying the power transmission apparatus 102 of the reception power value of power actually received by the power reception apparatus 101 at that time. In a case where the RP packet is received (YES in step S603), the processing proceeds to step S604. In a case where the RP packet is not received (NO in step S603), the processing in FIG. 6 ends.

In step S604, the control unit 300 performs the foreign object detection process to calculate the presence probability of the foreign object. The presence probability of the foreign object is calculated based on the ratio of an error in the amount of power loss to the power loss value on the calibration curve, i.e., "|Ploss3−Ploss3'|/Ploss3". The present disclosure, however, is not limited to this. For example, the control unit 300 can weigh the calculated presence probability according to the absolute value of the transmission power value. For example, in a case where the transmission power value is small, the control unit 300 multiplies the presence probability by a coefficient to decrease the presence probability. In a case where the transmission power value is great, the control unit 300 multiplies the presence probability by a coefficient to increase the presence probability. In a case where the amount of power loss is greater than or equal to a predetermined value, the control unit 300 can set the presence probability of the foreign object to 100%, regardless of the calculated presence probability. Thus, when the transmission power value is great, i.e., when it is considered that there is a higher possibility that heat generation or ignition occurs if the power transmission is continued in the state where the foreign object is mixed in, the control unit 300 is certainly able to notify the power reception apparatus 101 that there is a possibility that the foreign object is present.

In step S605, the control unit 300 determines whether the presence probability of the foreign object is greater than or equal to a first threshold. In a case where the presence probability of the foreign object is greater than or equal to the first threshold (YES in step S605), the processing proceeds to step S606. In a case where the presence probability of the foreign object is not greater than or equal to the first threshold (NO in step S605), the processing proceeds to step S608.

In step S606, in response to the RP packet received in step S603, the control unit 300 transmits to the power reception apparatus 101 a response indicating that there is a notification. Then, the processing proceeds to step S607.

In step S607, the control unit 300 transmits foreign object detection information not containing information about a request for a start of a process, i.e., containing only information about the presence probability of the foreign object (no information about the request for a start of a process), to the power reception apparatus 101. The information about the presence probability of the foreign object is a value obtained by converting the value calculated in step S604 into a value represented in a predetermined range (section) (e.g., a value in increments of 1 from 0 to 10). The present disclosure, however, is not limited to this. For example, the information about the presence probability of the foreign object can be data indicating the presence probability of the foreign object defined in advance by the power transmission apparatus 102 and the power reception apparatus 101 (e.g., 0x00=a low probability, 0x01=a medium probability, and 0x10=a high probability). As described above, in a case where the presence probability of the foreign object is greater than or equal to the first threshold, the control unit 300 does not contain information about a request for a start of a process that is for continuation of the transmission and reception of power in foreign object detection information, whereby the possibility that heat generation or ignition occurs due to continuation of the transmission and reception of power is able to be reduced. In a case where the control unit 300 transmits the above foreign object detection information without the information about the request for a start of the process, the processing in FIG. 6 ends.

In step S608, the control unit 300 determines whether the presence probability of the foreign object is greater than or equal to a second threshold. The second threshold is a value smaller than that of the first threshold. That is, the probability of the foreign object indicated by the second threshold is lower than the presence probability of the foreign object indicated by the first threshold. Alternatively, the first and second thresholds can be the same value, and the second threshold is less than or equal to the first threshold. In a case where the presence probability of the foreign object is greater than or equal to the second threshold (YES in step S608), the processing proceeds to step S612. In a case where the presence probability of the foreign object is not greater than or equal to the second threshold (NO in step S608), the processing proceeds to step S609.

In step S609, the control unit 300 determines whether the reception power value of the power reception apparatus 101 in the RP packet received in step S603 is greater than a predetermined proportion relative to the maximum reception power value (Pr2 in FIG. 11) of the calibration curve 1102. In a case where the reception power value of the power reception apparatus 101 is greater than the predetermined proportion (YES in step S609), the processing proceeds to step S610. In a case where the reception power value of the power reception apparatus 101 is not greater than the predetermined proportion (NO in step S609), the processing proceeds to step S614.

While, in step S609, the control unit 300 determines whether the reception power value is greater than the predetermined proportion relative to the maximum reception power value of the calibration curve 1102, the present disclosure is not limited to this. For example, the control unit 300 can determine whether the difference between the reception power value and the maximum reception power value of the calibration curve 1102 is greater than or equal to a threshold, or can determine whether the reception power value is greater than the maximum reception power value of the calibration curve 1102.

In step S610, in response to the RP packet received in step S603, the control unit 300 transmits to the power reception apparatus 101 a response indicating that there is a notification. Then, the processing proceeds to step S611.

In step S611, the control unit 300 transmits foreign object detection information containing information about a request for a start of additional execution of the calibration to the power reception apparatus 101 in addition to the information about the presence probability of the foreign object, and the processing in FIG. 6 ends. The information about the request for a start of the process is data indicating the type of the process defined in advance by the power transmission apparatus 102 and the power reception apparatus 101 (e.g., 0x01=the additional execution of the calibration and 0x10=the re-execution of the calibration). The present disclosure, however, is not limited to this.

In step S612, the control unit 300 determines whether the measurement of time using the timer 308 is already started. In a case where the measurement of time using the timer 308 is already started (YES in step S612), the processing proceeds to step S616. In a case where the measurement of time using the timer 308 is not already started (NO in step S612), the processing proceeds to step S613.

In step S613, the control unit 300 starts the measurement of time using the timer 308, and the processing proceeds to step S617.

In step S614, the control unit 300 determines whether the measurement of time using the timer 308 is already started. In a case where the measurement of time using the timer 308 is already started (YES in step S614), the processing proceeds to step S615. In a case where the measurement of time using the timer is not already started (NO in step S614), the processing proceeds to step S617.

In step S615, the control unit 300 stops the measurement of time using the timer 308, and the processing proceeds to step S617.

In step S616, the control unit 300 determines whether a predetermined time elapses after the measurement of time using the timer 308 is started in step S613. In a case where the predetermined time elapses (YES in step S616), the processing proceeds to step S618. In a case where the predetermined time does not elapse (NO in step S616), the processing proceeds to step S617.

In step S617, in response to the RP packet received in step S603, the control unit 300 transmits ACK as an acceptance response to the power reception apparatus 101, and the processing in FIG. 6 ends.

In step S618, in response to the RP packet received in step S603, the control unit 300 transmits to the power reception apparatus 101 a response indicating that there is a notification. Then, the processing proceeds to step S619.

In step S619, the control unit 300 transmits foreign object detection information containing information about a request for a start of re-execution of the calibration to the power reception apparatus 101 in addition to the information about the presence probability of the foreign object. As described above, in a case where the state where the presence probability of the foreign object is not greater than or equal to the first threshold, but is greater than or equal to the second threshold continues for the predetermined time, the control unit 300 performs control to re-derive the calibration curve. In the above state, it may be considered that the characteristics of the calibration curve is changed due to heat generation or a positional shift in the power reception apparatus 101. The expression that the characteristics of the calibration curve is changed indicates that the slope of the curve or the value of an intercept changes. With the control, the control unit 300 is able to calculate the amount of power loss more appropriately, i.e., perform foreign object detection with higher accuracy, in comparison with a case where the calibration curve the characteristics of which are changed is kept to be used, whereby a safer wireless power transmission system 100 is realized. When the control unit 300 transmits the above foreign object detection information containing the information about the request for a start of re-execution of the calibration to the power reception apparatus 101, the processing in FIG. 6 ends.

According to the above operation, the control unit 300 controls a request to start an appropriate process according to the presence probability of the foreign object calculated by the foreign object detection process, whereby a safer and higher efficiency wireless power transmission system 100 is realized.

(Procedure of Processing of Wireless Power Transmission System)

An operation sequence in a case where the power transmission apparatus 102 executes the above processing is described using some situations. In the initial state, the power reception apparatus 101 is not placed on the power transmission apparatus 102, and the power transmission apparatus 102 has a sufficient power transmission capability to execute the transmission of power with the GP requested by the power reception apparatus 101.

First Processing Example

First, a first processing example is described. In the first processing example, in the first negotiation phase, the GP is determined as 5 watts, and the transmission of power is started. Then, after the transmission of power is started, the GP is redetermined as 15 watts by the re-execution of the negotiation phase. The reception power value of the power reception apparatus 101 is increased according to the redetermined GP, and the reception power value becomes greater than the predetermined proportion relative to the maximum reception power value of the calibration curve 1102 (i.e., 5 watts). In this process, the power transmission apparatus 102 transmits foreign object detection information containing information about a request for a start of additional execution of the calibration to the power reception apparatus 101 in addition to the information about the presence probability of the foreign object. For example, the predetermined proportion for determining that the request to start the additional execution of the calibration is to be issued is 20%. The predetermined proportion, however, is merely an example, and may be another value.

Figure 7:
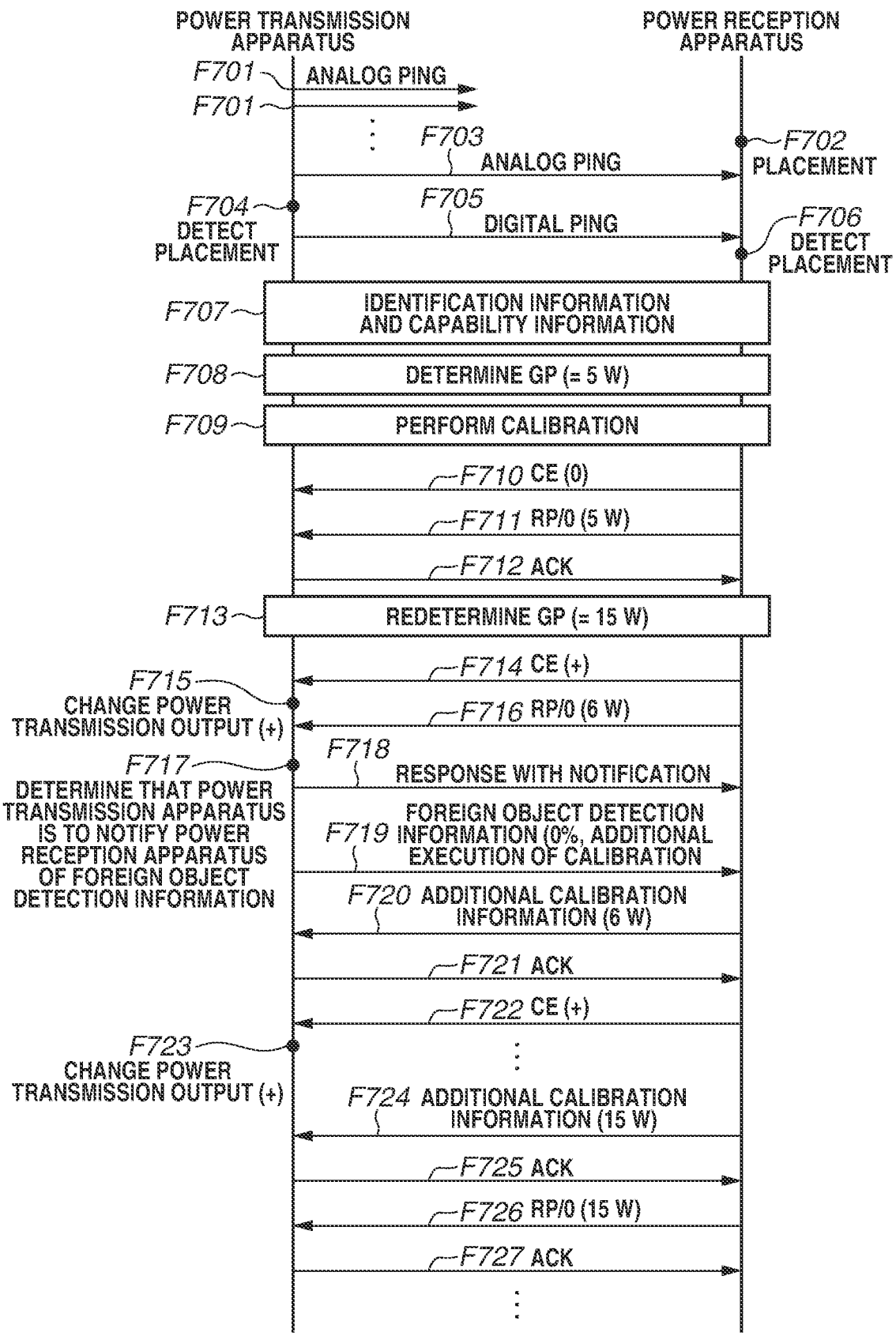
FIG. 7 is a diagram illustrating an operation sequence in a first processing example.

FIG. 7 is a diagram illustrating the operation sequence of the power transmission apparatus 102 and the power reception apparatus 101 in the first processing example. In step F701, the power transmission apparatus 102 transmits an analog ping and waits for an object to be placed on the power transmission apparatus 102 (step S501).

In step F702, the power reception apparatus 101 is placed on the power transmission apparatus 102. As a result, in step F703, the analog ping transmitted from the power transmission apparatus 102 changes. In step F704, in a case where the analog ping changes, the power transmission apparatus 102 detects that an object is placed on the power transmission apparatus 102. In step F705, the power transmission apparatus 102 transmits a digital ping.

In step F706, the power reception apparatus 101 receives the digital ping and detects that the power reception apparatus 101 is placed on the power transmission apparatus 102. According to a response to the digital ping of the power reception apparatus 101, the power transmission apparatus 102 detects that the placed object is the power reception apparatus 101.

In step F707, the power transmission apparatus 102 receives identification information and capability information from the power reception apparatus 101 through communication in the configuration phase (step S502). Next, in step F708, the power transmission apparatus 102 and the power reception apparatus 101 execute communication in the negotiation phase with each other and determine to set the GP to 5 watts (step S503).

In step F709, the power transmission apparatus 102 and the power reception apparatus 101 derive the calibration curve 1102 through communication in the calibration phase (step S504). When the derivation of the calibration curve is completed, the power transmission apparatus 102 starts the transmission of power and a power transmission control process (steps S505 and S506).

In step F710, the power transmission apparatus 102 receives the CE packet containing 0 as the control error value, from the power reception apparatus 101 (YES in step S601), and the power transmission apparatus 102 does not change the power transmission output according to the control error value (step S602).

In step F711, the power transmission apparatus 102 receives the RP packet (the mode 0) indicating that the reception power value is 5 watts, from the power reception apparatus 101 (YES in step S603), and the power transmission apparatus 102 performs the foreign object detection process to calculate the presence probability of the foreign object (step S604). In this case, the presence probability of the foreign object is 0%.

In step F712, the power transmission apparatus 102 determines that the presence probability of the foreign object is 0% and is less than the first and second thresholds (NO in step S605, NO in step S608), and the reception power value is not greater than the predetermined proportion (NO in step S609). Further, the power transmission apparatus 102 determines that the measurement of time using the timer 308 is not already started (NO in step S614), and the power transmission apparatus 102 returns ACK to the power reception apparatus 101 (step S617).

In step F713, the power transmission apparatus 102 and the power reception apparatus 101 execute communication in the negotiation phase with each other again and determine to set the GP to 15 watts.

In step F714, the power transmission apparatus 102 receives the CE packet containing a positive value as the control error value, from the power reception apparatus 101 (YES in step S601).

In step F715, the power transmission apparatus 102 increases the power transmission output according to the control error value (step S602).

In step F716, the power transmission apparatus 102 receives the RP packet (the mode 0) indicating that the reception power value is 6 watts, from the power reception apparatus 101 (YES in step S603), and the power transmission apparatus 102 performs the foreign object detection process to calculate the presence probability of the foreign object (step S604).

In step F717, the power transmission apparatus 102 determines that the presence probability of the foreign object is less than the first and second thresholds (NO in step S605, NO in step S608), and the reception power value is greater than the predetermined proportion (YES in step S609), and the power transmission apparatus 102 determines that the power transmission apparatus 102 is to notify the power reception apparatus 101 of foreign object detection information.

In step F718, the power transmission apparatus 102 transmits to the power reception apparatus 101 a response indicating that there is a notification (step S610).

In step F719, since the presence probability of the foreign object is 0 at the current moment, the power transmission apparatus 102 transmits foreign object detection information containing information about a request for a start of additional execution of the calibration to the power reception apparatus 101 (step S611). When the power reception apparatus 101 receives the foreign object detection information, the power reception apparatus 101 starts the additional execution of the calibration.

In step F720, the power transmission apparatus 102 receives additional calibration information indicating the reception power value is 6 watts.

In step F721, the power transmission apparatus 102 accepts the above additional calibration information as a value in the calibration curve 1102, extends the ends of the calibration curve 1102, and returns ACK to the power reception apparatus 101.

While the additional calibration information is the RP packet (the mode 2), the present disclosure is not limited to this. For example, the additional calibration information can be the RP packet in another mode, or the power transmission apparatus 102 can be notified, using another packet different from the RP packet, of a reception power value to be used as an additional value in the calibration curve 1102.

Because the processes of step F722 to F725 are similar to the processes of steps F714, F715, F720, and F721, the redundant descriptions are omitted.

In step F726, the power transmission apparatus 102 receives the RP packet (the mode 0) indicating that the reception power value is 15 watts.

In step F727, the power transmission apparatus 102 determines that the additional execution of the calibration is normally completed. Then, the power transmission apparatus 102 returns ACK to the power reception apparatus 101 and starts the power transmission control process again.

According to the above, in a case where the presence probability of the foreign object is not greater than or equal to the first and second thresholds, and the reception power value is greater than the predetermined proportion relative to the maximum reception power value of the calibration curve 1102, the power transmission apparatus 102 notifies the power reception apparatus 101 of foreign object detection information containing information about a request for a start of a process in the foreign object detection information. With the above procedure, after determination that there is a low probability that the foreign object is mixed in, the power transmission apparatus 102 is able to avoid transmission of power based on a reception power value outside the calibration curve 1102 while increasing the power transmission output. The power transmission apparatus 102 is able to achieve a safer and higher efficiency wireless power transmission system 100.

Second Processing Example

Next, a second processing example is described. In the second processing example, in the first negotiation phase, the GP is determined to be set at 5 watts, and the transmission of power is started. Then, after the transmission of power is started, the GP is redetermined to be set at 15 watts by the re-execution of the negotiation phase. As the reception power value of the power reception apparatus 101 increases, the foreign object is mixed in. Then, the reception power value of the power reception apparatus 101 becomes greater than the predetermined proportion relative to the maximum reception power value of the calibration curve 1102 (i.e., 5 watts). At this time, as a result of the foreign object detection process, the presence probability of the foreign object is greater than or equal to the first threshold, and thus, the power transmission apparatus 102 transmits foreign object detection information to the power reception apparatus 101 without including a request to start the additional execution of the calibration in the foreign object detection information. While, in this description, the first threshold is 75%, and the predetermined proportion for determining that the request to start the additional execution of the calibration is set to be 20%, these values are merely examples, and can be other values.

Figure 8:
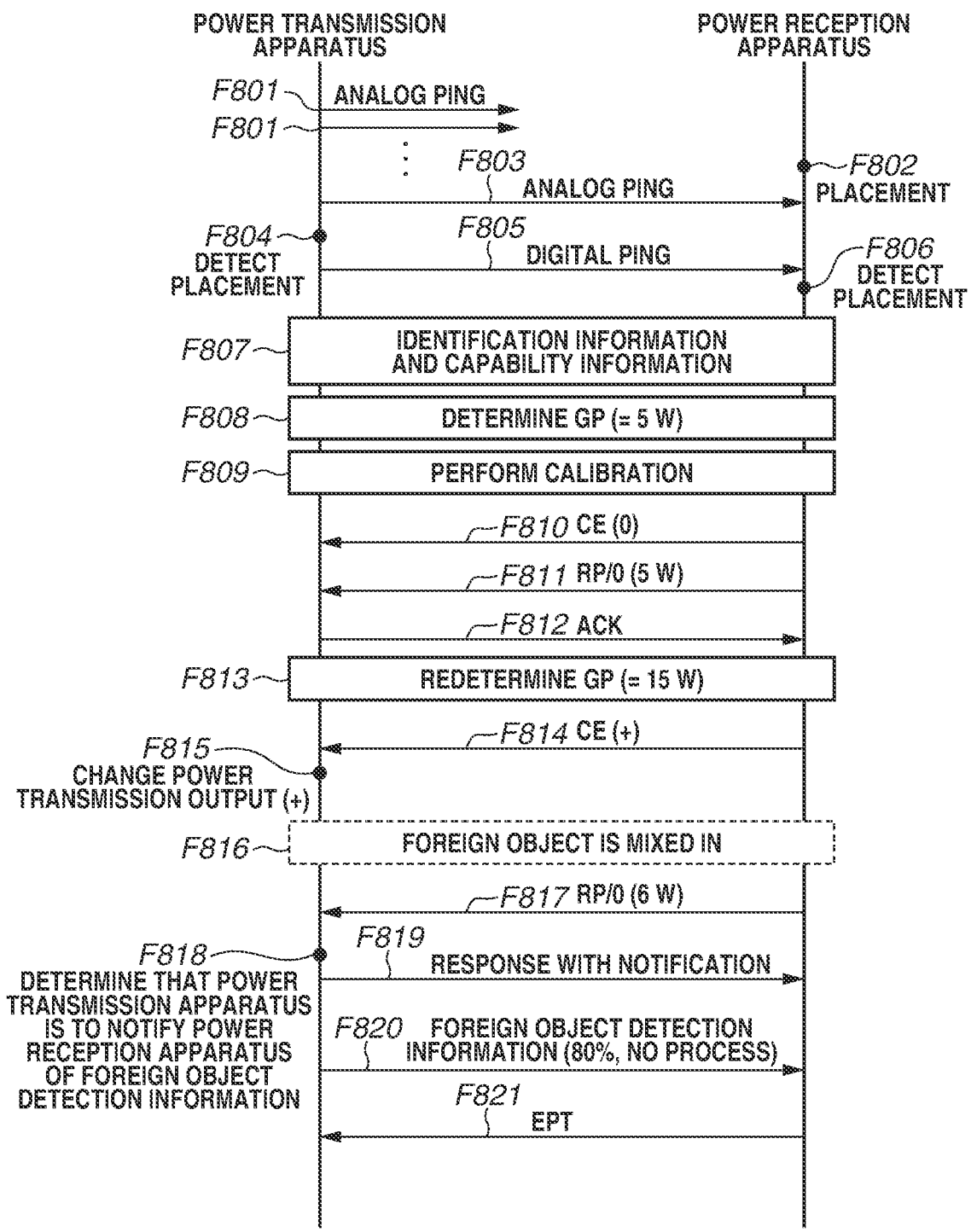
FIG. 8 is a diagram illustrating an operation sequence in a second processing example.

FIG. 8 is a diagram illustrating the operation sequence of the power transmission apparatus 102 and the power reception apparatus 101 in the second processing example. The processes of steps F801 to F815 are similar to the processes of steps F701 to F715 in FIG. 7, and the redundant descriptions are omitted.

In step F816, the foreign object is mixed into the range 104 of the power transmission apparatus 102. In step F817, the power transmission apparatus 102 receives the RP packet (the mode 0) indicating that the reception power value is 6 watts, from the power reception apparatus 101 (YES in step S603). Then, the power transmission apparatus 102 performs the foreign object detection process to calculate the presence probability of the foreign object (step S604).

In step F818, the presence probability of the foreign object is 80% and is greater than or equal to 75% as the first threshold (YES in step S605), and thus, the power transmission apparatus 102 determines that the power transmission apparatus 102 is to notify the power reception apparatus 101 of foreign object detection information.

In step F819, the power transmission apparatus 102 transmits to the power reception apparatus 101 a response indicating that there is a notification (step S606).

In step F820, the power transmission apparatus 102 transmits foreign object detection information that does not contain information about a request for a start of a process, i.e., that contains only the information about the presence probability of the foreign object, to the power reception apparatus 101 (step S607).

In step F821, since the presence probability of the foreign object contained in the received foreign object detection information is high, the power reception apparatus 101 determines that the transmission and reception of power are to be stopped. Then, the power reception apparatus 101 transmits end power transfer (EPT) to the power transmission apparatus 102. The power transmission apparatus 102 receives the EPT and stops the transmission of power to the power reception apparatus 101.

According to the above processing, in a case where the presence probability of the foreign object is greater than or equal to the first threshold, the power transmission apparatus 102 does not include, in foreign object detection information, information about a request for a start of a process on the basis of continuation of the transmission and reception of power, i.e., performs control to set the content of the foreign object detection information to be consistent. Consequently, the power reception apparatus 101 having received the foreign object detection information is able to appropriately determine a process according to the presence probability of the foreign object and reduce the possibility that the transmission and reception of power continue with the foreign object mixed in. Thus, the power reception apparatus 101 is able to achieve a safer wireless power transmission system 100.

In a case where the presence probability of the foreign object is greater than or equal to the first threshold, the power transmission apparatus 102 unconditionally performs the processing to notify the power reception apparatus 101 of foreign object detection information that does not contain information about a request for a start of a process. Alternatively, the power transmission apparatus 102 can notify the power reception apparatus 101 of foreign object detection information containing information about a request for a stop of reception of power or reduce the reception power in the foreign object detection information. In a case where there is a high probability that the foreign object is present, the power reception apparatus 101 is able to notify the power transmission apparatus 102 of a request to start a process that is not on a basis of the continuation of the transmission and reception of power, or a process of decreasing the power transmission output. Thus, the power reception apparatus 101 is able to reduce the possibility that heat generation or ignition occurs.

In a case where the presence probability of the foreign object contained in the received foreign object detection information is high, the power reception apparatus 101 transmits EPT to the power transmission apparatus 102, and the power transmission apparatus 102 stops the transmission of power. Alternatively, the power transmission can be continued without stopping. For example, the power transmission apparatus 102 can perform control to decrease the transmission power and the reception power. With this control, the power transmission apparatus 102 and the power reception apparatus 101 can maintain the transmission and reception of power while reducing the possibility that heat generation or ignition occurs.

Further, after transmitting the foreign object detection information, the power transmission apparatus 102 waits for the power reception apparatus 101 to start the process. Alternatively, the power transmission apparatus 102 itself can perform control to stop the transmission of power or decrease the power transmission output. With this control, in a case where there is a high probability that the foreign object is present, the power transmission apparatus 102 can reduce the possibility that heat generation or ignition occurs, at an earlier timing.

Third Processing Example

Next, a third processing example is described. In the third processing example, in the first negotiation phase, the GP is determined to be set at 15 watts, and the transmission of power is started. Then, after the transmission of power is started, the state where the presence probability of the foreign object is not greater than or equal to the first threshold and is greater than or equal to the second threshold continues for the predetermined time or more. In this case, the power transmission apparatus 102 determines that the characteristics of the calibration curve 1102 change due to heat generation or a positional shift of the power reception apparatus 101. Then, the power transmission apparatus 102 transmits foreign object detection information containing information about a request for a start of re-execution of the calibration to the power reception apparatus 101 in addition to the information about the presence probability of the foreign object. The description is given using a case where the first threshold is 75%, and the second threshold is 25%. These values, however, are merely examples, and can be other values with which the first threshold is greater than the second threshold. Alternatively, the first threshold may be the same as the second threshold.

Figure 9:
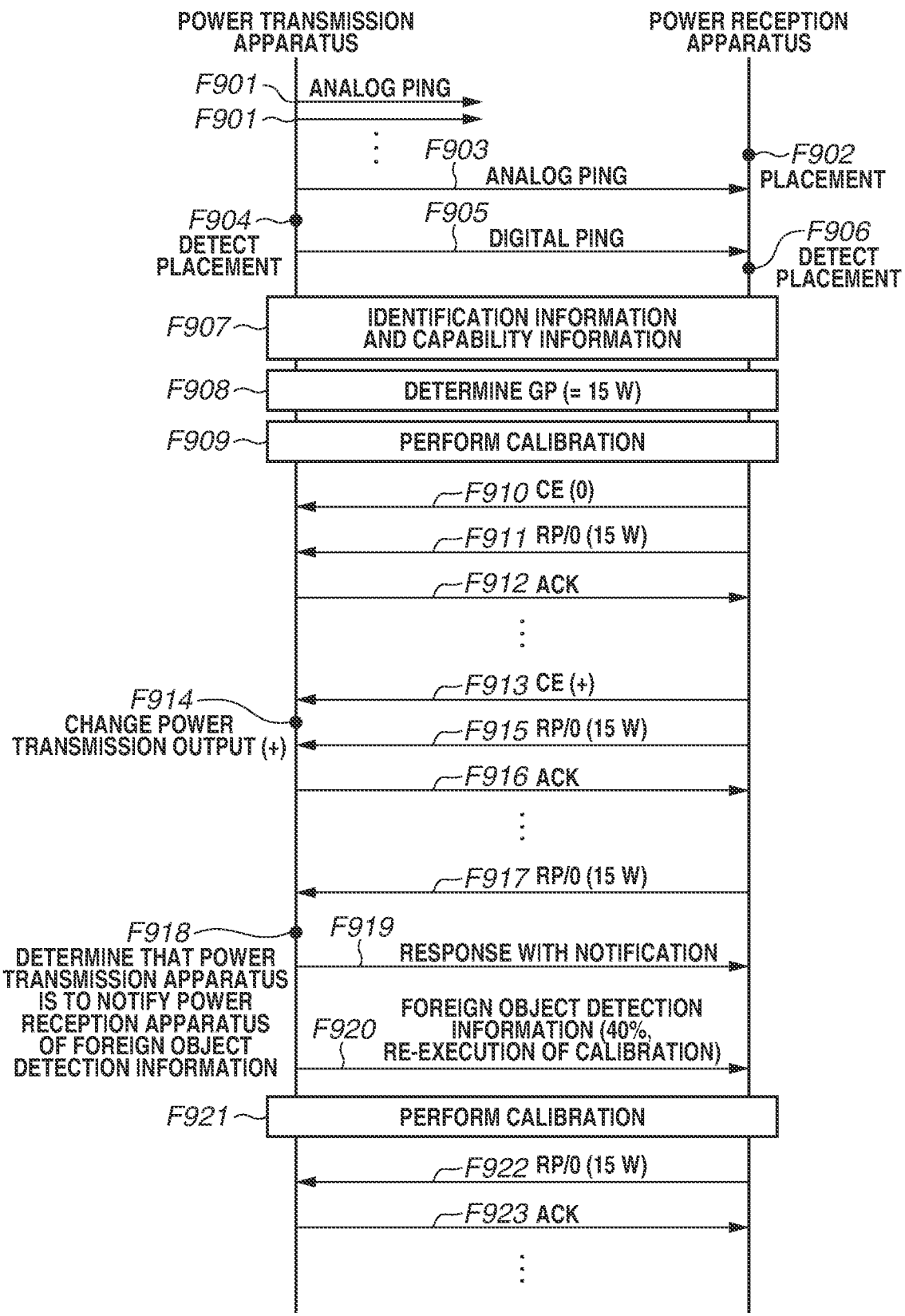
FIG. 9 is a diagram illustrating an operation sequence in a third processing example.

FIG. 9 is a diagram illustrating the operation sequence of the power transmission apparatus 102 and the power reception apparatus 101 in the third processing example. The processes of steps F901 to F907 are similar to the processes of steps F701 to F707 in FIG. 7, and the redundant descriptions are omitted.

In step F908, the power transmission apparatus 102 and the power reception apparatus 101 execute communication in the negotiation phase with each other and determine that the GP is set to be 15 watts (step S503).

In step F909, the power transmission apparatus 102 and the power reception apparatus 101 derive the calibration curve 1102 through communication in the calibration phase (step S504).

In step F910, the power transmission apparatus 102 receives the CE packet containing 0 as the control error value from the power reception apparatus 101 (YES in step S601). Then, the power transmission apparatus 102 does not change the power transmission output according to the control error value (step S602).

In step F911, the power transmission apparatus 102 receives the RP packet (the mode 0) indicating that the reception power value is 15 watts, from the power reception apparatus 101 (YES in step S603). Then, the power transmission apparatus 102 performs the foreign object detection process to calculate the presence probability of the foreign object (step S604). In this case, the presence probability of the foreign object is 0%.

In step F912, the power transmission apparatus 102 determines that the presence probability of the foreign object is 0% and is less than the first and second thresholds (NO in step S605, NO in step S608), and the reception power value is not greater than the predetermined proportion (NO in step S609). Further, the power transmission apparatus 102 determines that the measurement of time using the timer 308 is not already started (NO in step S614). Then, the power transmission apparatus 102 returns ACK to the power reception apparatus 101 (step S617).

In step F913, the power transmission apparatus 102 receives the CE packet containing a positive value as the control error value from the power reception apparatus 101 (YES in step S601).

In step F914, the power transmission apparatus 102 increases the power transmission output according to the control error value (step S602).

In step F915, the power transmission apparatus 102 receives the RP packet (the mode 0) indicating that the reception power value is 15 watts, from the power reception apparatus 101 (YES in step S603). Then, the power transmission apparatus 102 performs the foreign object detection process to calculate the presence probability of the foreign object (step S604). For example, the reception power value remains 15 watts in response to the increase in the power transmission output in step F914, which means that the power loss increases, and the presence probability of a foreign object changes to 40%.

In step F916, the power transmission apparatus 102 determines that the presence probability of the foreign object is 40% and is less than the first threshold and greater than or equal to the second threshold (NO in step S605, YES in step S608), and the measurement of time using the timer 308 is not already started (NO in step S612). Then, the power transmission apparatus 102 starts the measurement of time using the timer 308 (step S613), and returns ACK to the power reception apparatus 101 (step S617).

In step F917, the power transmission apparatus 102 receives the RP packet (the mode 0) indicating that the reception power value is 15 watts, from the power reception apparatus 101 again (YES in step S603). Then, the power transmission apparatus 102 performs the foreign object detection process to calculate the presence probability of the foreign object (step S604). For example, the power loss continues to increase, and the presence probability of the foreign object is 40%.

In step F918, the power transmission apparatus 102 determines that the presence probability of the foreign object is 40% and is less than the first threshold and greater than or equal to the second threshold (NO in step S605, YES in step S608). Then, the power transmission apparatus 102 determines that the predetermined time elapses after the measurement of time using the timer 308 is started (YES in step S612, YES in step S616). Then, the power transmission apparatus 102 determines that the power transmission apparatus 102 is to notify the power reception apparatus 101 of foreign object detection information.

In step F919, the power transmission apparatus 102 transmits to the power reception apparatus 101 a response indicating that there is a notification (step S618).

In step F920, the power transmission apparatus 102 transmits foreign object detection information containing information about a request for a start of re-execution of the calibration to the power reception apparatus 101 in addition to the information about the presence probability of the foreign object (step S619).

In step F921, the power transmission apparatus 102 and the power reception apparatus 101 re-derive the calibration curve 1102 through communication in the calibration phase.

In step F922, the power transmission apparatus 102 receives the RP packet (the mode 0) indicating that the reception power value is 15 watts. In step F923, the power transmission apparatus 102 returns ACK to the power reception apparatus 101 and resumes the power transmission control process.

As described above, in a case where the presence probability of the foreign object is not greater than or equal to the first threshold, but there is a possibility that power loss occurs due to the influence of heat generation or a positional shift of the power reception apparatus 101, the power transmission apparatus 102 transmits foreign object detection information containing information about a request for a start of re-execution of the calibration. Consequently, the power transmission apparatus 102 is able to derive an appropriate calibration curve 1102 according to the changed characteristics and perform foreign object detection with higher accuracy than in a case where the same calibration curve 1102 continues to be used.

In the above example, in a case where the state where the presence probability of the foreign object is less than the first threshold and greater than or equal to the second threshold continues for the predetermined time, the power transmission apparatus 102 transmits foreign object detection information containing information about a request for start of re-execution of the calibration to the power reception apparatus 101. Alternatively, in a case where the presence probability of the foreign object is less than the first threshold and greater than or equal to the second threshold, the power transmission apparatus 102 can immediately transmit the foreign object detection information containing the information about the request for a start of re-execution of the calibration to the power reception apparatus 101. With this configuration, the power transmission apparatus 102 is able to shorten the period when the foreign object detection is performed using the same calibration curve 1102.

As described above, the wireless power transmission system 100 includes the power transmission apparatus 102 that wirelessly transmits power to the power reception apparatus 101, and the power reception apparatus 101 that wirelessly receives power from the power transmission apparatus 102. First, the processing in FIG. 9 is described. In step F909, the control unit 300 receives from the power reception apparatus 101 the reception power values Pr1 and Pr2 of the power reception apparatus 101 in a case where the power transmission apparatus 102 sequentially transmits power having the different transmission power values Pt1 and Pt2 to the power reception apparatus 101. Then, the control unit 300 functions as a derivation unit and derives a characteristic line indicating the relationship of the reception power value to the transmission power value based on the transmission power values Pt1 and Pt2 and the reception power values Pr1 and Pr2. The characteristic line is the calibration curve 1102.

In step S603 in FIG. 6, the control unit 300 functions as an acquisition unit and acquires a parameter (the reception power value of the power reception apparatus 101) to be used to determine the presence probability of the foreign object. The presence probability of the foreign object is the presence probability of an object different from the power reception apparatus 101. In step S604, the control unit 300 functions as a determination unit and determines the presence probability of the foreign object based on the parameter acquired in step S603.

In step S609, in a case where the reception power value of the power reception apparatus 101 is greater than a first reception power value, the processing proceeds to step S610. In a case where the reception power value of the power reception apparatus 101 is smaller than the first reception power value, the processing proceeds to step S614.

In step S608, in a case where the presence probability of the foreign object determined in step S604 is smaller than the first threshold and greater than the second threshold, the processing proceeds to step S612. The second threshold is smaller than the first threshold.

In step S609, in a case where the presence probability of the foreign object determined in step S604 is smaller than the first threshold and smaller than the second threshold, and the reception power value of the power reception apparatus 101 is greater than the first reception power value, the processing proceeds to step S610. In a case where the presence probability of the foreign object determined in step S604 is smaller than the first threshold and smaller than the second threshold, and the reception power value of the power reception apparatus 101 is smaller than the first reception power value, the processing proceeds to step S614.

In step S616, in a case where the state where the presence probability of the foreign object determined in step S604 is smaller than the first threshold and greater than the second threshold continues for the predetermined time, the processing proceeds to step S618.

In steps S607, S611, and S619, the control unit 300 functions as a transmission unit, and based on the presence probability of the foreign object determined in step S604, transmits a foreign object detection signal including information for identifying the presence probability of the foreign object to the power reception apparatus 101.

In step S611, the control unit 300 includes information about a request for a process related to additional acquisition of the parameter in a foreign object detection signal, and transmits the foreign object detection signal. In step S619, the control unit 300 includes information about a request for a process related to reacquisition of the parameter in a foreign object detection signal, and transmits the foreign object detection signal.

In step S607, the control unit 300 transmits the foreign object detection signal without including the information about a request for the process related to reacquisition of the parameter and the information about a request for the process related to additional acquisition of the parameter in the foreign object detection signal.

In step F917, the control unit 300 functions as a calculation unit. In response to the control unit 300 receiving the reception power value of the power reception apparatus 101 from the power reception apparatus 101, the control unit 300 calculates the presence probability of an object different from the power reception apparatus 101, based on the characteristic line. The above presence probability of the object is the presence probability of the foreign object.

In step F920, the control unit 300 functions as the transmission unit and transmits the presence probability of the object and a request to re-derive the characteristic line to the power reception apparatus 101, based on the presence probability of the object. The request to re-derive the characteristic line is a request to start re-execution of the calibration. Specifically, in a case where the presence probability of the object (40%) is not greater than or equal to the first threshold and is greater than or equal to the second threshold, the control unit 300 transmits the presence probability of the object and the request to re-derive the characteristic line to the power reception apparatus 101. The second threshold is smaller than the first threshold. In a case where the state where the presence probability of the object is not greater than or equal to the first threshold and is greater than or equal to the second threshold continues for the predetermined time, the control unit 300 may transmit the presence probability of the object and the request to re-derive the characteristic line to the power reception apparatus 101.

Step F921 is a process after the transmission in step F920. In step F921, the control unit 300 receives from the power reception apparatus 101 the reception power values of the power reception apparatus 101 in a case where power having the different transmission power values is sequentially transmitted to the power reception apparatus 101. Then, the control unit 300 derives the characteristic line indicating the relationship of the reception power value to the transmission power value.

Next, the processing in FIG. 8 is described. In step F820, the control unit 300 functions as the transmission unit. In a case where the presence probability of the object (80%) is greater than or equal to the first threshold, the control unit 300 does not transmit a request to re-derive the characteristic line to the power reception apparatus 101, and transmits the presence probability of the object to the power reception apparatus 101.

Next, the processing in FIGS. 6 and 7 is described. In a case where the presence probability of the object (0%) is not greater than or equal to the second threshold (NO in step S608), and the reception power value received in step S603 is greater than the maximum reception power value Pr2 of the characteristic line (YES in step S609), the processing proceeds to step S610.

In step S609, in a case where the reception power value received in step S603 is greater than the predetermined proportion relative to the maximum reception power value Pr2 of the characteristic line, the processing may proceed to step S610. Alternatively, in step S609, in a case where a value obtained by subtracting the maximum reception power value Pr2 of the characteristic line from the reception power value received in step S603 is greater than a predetermined value, the processing may proceed to step S610.

In step S611, the control unit 300 functions as the transmission unit and transmits the presence probability of the object and an additional request for the reception power value of the characteristic line to the power reception apparatus 101 (step F719). The additional request for the reception power value of the characteristic line is a request to start the additional execution of the calibration. In step S607, the control unit 300 does not transmit the additional request for the reception power value of the characteristic line to the power reception apparatus 101, and transmits the presence probability of the object to the power reception apparatus 101.

After the transmission in step F719, then in step F720, the control unit 300 receives the reception power value of the power reception apparatus 101 from the power reception apparatus 101. In step F721, the control unit 300 functions as a correction unit and extends the end of the characteristic line based on the received reception power value to correct the characteristic line.

According to the present exemplary embodiment, the power transmission apparatus 102 is able to appropriately transmit information based on the presence probability of an object different from the power reception apparatus 101 to the power reception apparatus 101.

Second Exemplary Embodiment

In the first exemplary embodiment, the power transmission apparatus 102 that performs the foreign object detection process determines, according to the calculated presence probability of the foreign object, whether to include information about a request for a start of a process in foreign object detection information, and performs control. However, not all the foreign object detection information received by the power reception apparatus 101 may contain appropriate information. That is, even when the presence probability of the foreign object is high, whether the power reception apparatus 101 receives foreign object detection information containing a request to continue the power transmission/reception process is not able to be controlled. Thus, to improve the safety of the wireless power transmission system 100, it is desirable to appropriately control also the power reception apparatus 101. In a second exemplary embodiment, as an example of the control, the power reception apparatus 101 determines whether to start a process requested with foreign object detection information, and performs control.

(Procedure of Processing by Power Reception Apparatus)

Figure 10:
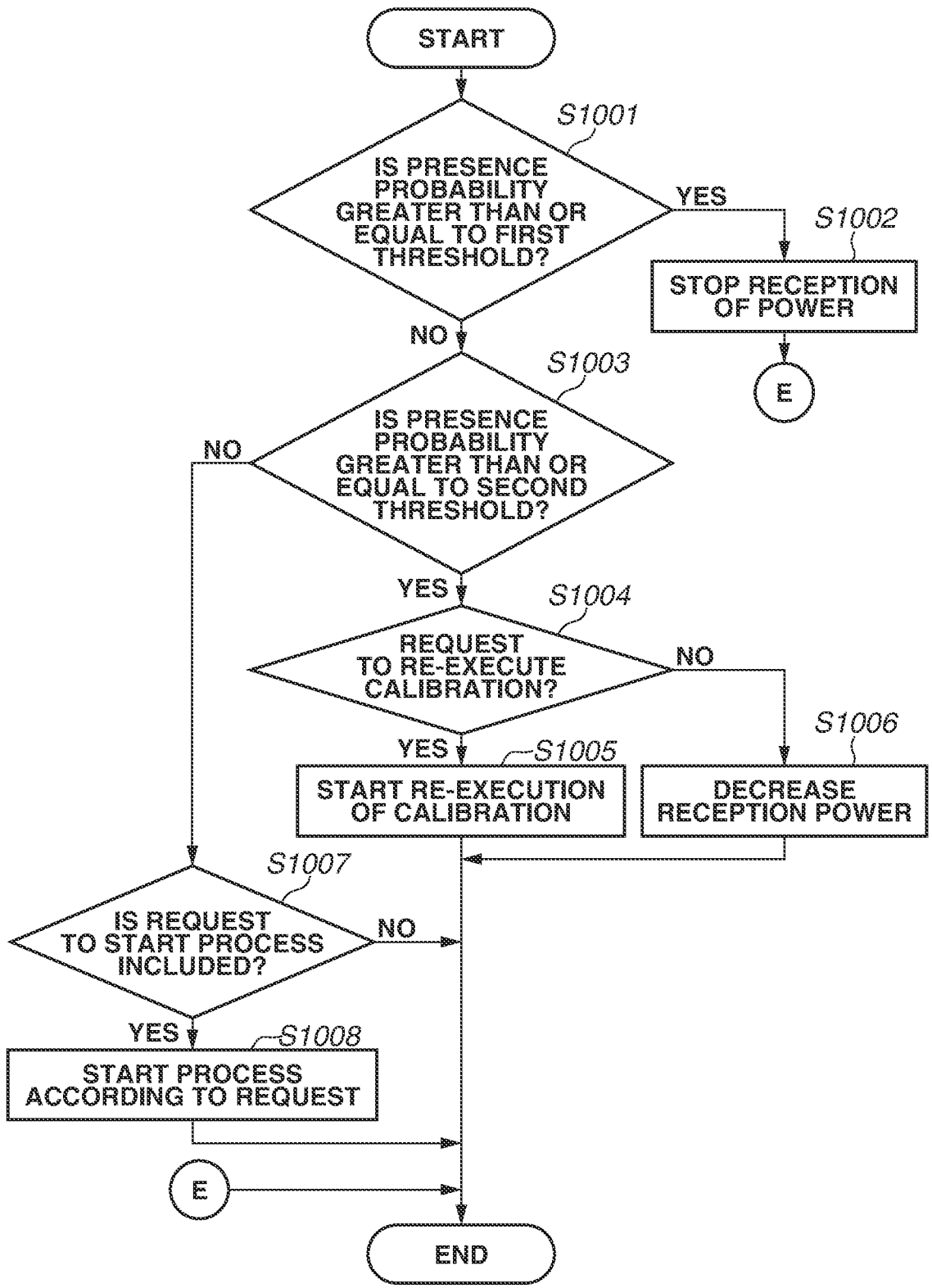
FIG. 10 is a flowchart of a processing start determination process that is executed by the power reception apparatus.

FIG. 10 is a flowchart illustrating a control method for controlling the power reception apparatus 101 according to the second exemplary embodiment. The processing in FIG. 10 is achieved by, for example, the control unit 200 of the power reception apparatus 101 executing a program read from the memory 209. At least a part of the following processing may be achieved by hardware. The hardware in this case can be achieved by, for example, using a predetermined compiler to automatically generate a dedicated circuit that uses a gate array circuit, such as an FPGA, according to a program for achieving processing steps. The processing in FIG. 10 is executed according to the fact that the power reception apparatus 101 receives foreign object detection information from the power transmission apparatus 102. The present disclosure, however, is not limited to this. The processing in FIG. 10 may be started using another trigger.

In step S1001, in a case where the control unit 200 receives foreign object detection information from the power transmission apparatus 102, then based on the information about the presence probability of the foreign object contained in the foreign object detection information, the control unit 200 determines whether the presence probability of the foreign object is greater than or equal to the first threshold. In a case where the presence probability of the foreign object is greater than or equal to the first threshold (YES in step S1001), the processing proceeds to step S1002. In a case where the presence probability of the foreign object is not greater than or equal to the first threshold (NO in step S1001), the processing proceeds to step S1003.

In step S1002, the control unit 200 performs control to stop reception of power, and the processing in FIG. 10 ends. As described above, in a case where the presence probability of the foreign object is greater than or equal to the first threshold, the control unit 200 immediately stops reception of power, whereby heat generation or ignition is able to be prevented.

In step S1003, the control unit 200 determines whether the presence probability of the foreign object is greater than or equal to the second threshold. In a case where the presence probability of the foreign object is greater than or equal to the second threshold (YES in step S1003), the processing proceeds to step S1004. In a case where the presence probability of the foreign object is not greater than or equal to the second threshold (NO in step S1003), the processing proceeds to step S1007.

In step S1004, the control unit 200 determines whether information about a request for a start of re-execution of the calibration is contained in the received foreign object detection information. In a case where the information about the request for a start of re-execution of the calibration is contained (YES in step S1004), the processing proceeds to step S1005. In a case where the information about the request for a start of re-execution of the calibration is not contained (NO in step S1004), the processing proceeds to step S1006.

In step S1005, the control unit 200 controls the power transmission apparatus 102 to start re-execution of the calibration, and the processing in FIG. 10 ends.

In step S1006, the control unit 200 performs control to decrease the reception power, and the processing in FIG. 10 ends.

As described above, in a case where the presence probability of the foreign object is not greater than or equal to the first threshold, but is greater than or equal to the second threshold, it can be considered that the power loss increases due to heat generation or a positional shift. Thus, the control unit 200 performs control to re-execute the calibration or decrease the reception power. Consequently, the wireless power transmission system 100 is able to prevent continuation of the transmission and reception of power with high output in the state where the characteristics of the calibration curve 1102 are changed.

In step S1007, the control unit 200 determines whether information about a request for a start of a process is contained in the received foreign object detection information. In a case where the information about the request for a start of the process is contained (YES in step S1007), the processing proceeds to step S1008. In a case where the information about the request for a start of the process is not contained (NO in step S1007), the processing in FIG. 10 ends.

In step S1008, the control unit 200 performs control to start the process according to the above request to start the process, and the processing in FIG. 10 ends.

According to the above processing, the control unit 200 performs appropriate control to start a process according to the information about the presence probability of the foreign object contained in received foreign object detection information, whereby the wireless power transmission system 100 which is safer and higher efficiency is achieved.

Step F909 in FIG. 9 is a process for the power transmission apparatus 102 to derive a characteristic line indicating the relationship of the reception power value to the transmission power value. The characteristic line is the calibration curve 1102. In step F909, the control unit 200 functions as a transmission unit and transmits to the power transmission apparatus 102 the reception power values Pr1 and Pr2 of the power reception apparatus 101 in a case where the power transmission apparatus 102 sequentially transmits power having the different transmission power values Pt1 and Pt2 to the power reception apparatus 101.

After the power transmission apparatus 102 starts wireless transmission of power in step S505 in FIG. 5, then in step F917 in FIG. 9, the control unit 200 transmits the reception power value of the power reception apparatus 101 to the power transmission apparatus 102. In step F920, the control unit 200 functions as a reception unit and receives from the power transmission apparatus 102 the presence probability of an object different from the power reception apparatus 101 calculated by the power transmission apparatus 102 based on the reception power value of the power reception apparatus 101 and the characteristic line. The presence probability of the object is the presence probability of the foreign object.

In FIG. 10, in a case where the presence probability of the object is greater than or equal to the second threshold (YES in step S1003), and the control unit 200 receives a request to re-derive the characteristic line from the power transmission apparatus 102 (YES in step S1004), the processing proceeds to step S1005. The request to re-derive the characteristic line is a request to start re-execution of the calibration.

Step S1005 is a process for the power transmission apparatus 102 to derive the characteristic line indicating the relationship of the reception power value to the transmission power value. In step S1005, the control unit 200 functions as the transmission unit and transmits to the power transmission apparatus 102 the reception power values of the power reception apparatus 101 in a case where the power transmission apparatus 102 sequentially transmits power having the different transmission power values to the power reception apparatus 101.

In a case where the presence probability of the object is greater than or equal to the second threshold (YES in step S1003), and the control unit 200 does not receive the request to re-derive the characteristic line from the power transmission apparatus 102 (NO in step S1004), the processing proceeds to step S1006. In step S1006, the control unit 200 functions as a control unit and performs control to decrease the reception power.

In a case where the presence probability of the object is greater than or equal to the first threshold (YES in step S1001), the processing proceeds to step S1002. In step S1002, the control unit 200 functions as the control unit and performs control to stop the reception of power.

In a case where the presence probability of the object is not greater than or equal to the second threshold (NO in step S1003), and the control unit 200 receives an additional request for the reception power value of the characteristic line from the power transmission apparatus 102 (YES in step S1007, step F719 in FIG. 7), the processing proceeds to step S1008. The additional request for the reception power value of the characteristic line is a request to start additional execution of the calibration. In step S1008, the control unit 200 functions as the transmission unit and transmits the reception power value of the power reception apparatus 101 to the power transmission apparatus 102 (step F720 in FIG. 7).

The control unit 200 functions as the reception unit and receives a foreign object detection signal containing the presence probability of the foreign object from the power transmission apparatus 102. In step S1001 in FIG. 10, in a case where the presence probability of the foreign object is greater than the first threshold, the processing proceeds to step S1002. Then, the control unit 200 performs control to stop reception of power.

In step S1004, in a case where the received foreign object detection signal contains information about a request for a process related to reacquisition of a parameter (the reception power value of the power reception apparatus 101) that is used to determine the presence probability of the foreign object, the processing proceeds to step S1005. In step S1005, the control unit 200 executes the process related to reacquisition of the parameter.

In step S1007, in a case where the received foreign object detection signal contains information about a request for a process related to additional acquisition of the parameter (the reception power value of the power reception apparatus 101) that is used to determine the presence probability of the foreign object, the processing proceeds to step S1008. In step S1008, the control unit 200 executes the process related to additional acquisition of the parameter.

In step S1004, in a case where the presence probability of the foreign object is smaller than the first threshold and greater than the second threshold, and the received foreign object detection signal contains the information about a request for the process related to reacquisition of the parameter, the processing proceeds to step S1005. In a case where the presence probability of the foreign object is smaller than the first threshold and greater than the second threshold, and the received foreign object detection signal does not contain the information about a request for the process related to reacquisition of the parameter, the processing proceeds to step S1006. Then, the control unit 200 performs control to decrease the reception power.

In step S1007, in a case where the presence probability of the foreign object is smaller than the first threshold and smaller than the second threshold, and the received foreign object detection signal contains the information about a request for the process related to additional acquisition of the parameter, the processing proceeds to step S1008. In step S1008, the control unit 200 executes the process related to additional acquisition of the parameter.

According to the present exemplary embodiment, the power reception apparatus 101 is able to appropriately receive information based on the presence probability of an object different from the power reception apparatus 101 from the power transmission apparatus 102.

Other Exemplary Embodiments

Although the power transmission apparatus 102 calculates the presence probability of the foreign object using the power loss technique as a foreign object detection technique based on power loss as the foreign object detection process in the first and second exemplary embodiments, the power transmission apparatus 102 may calculate the presence probability of the foreign object using a different technique. For example, the power transmission apparatus 102 may perform foreign object detection based on the Q factor in a time domain indicating an attenuation state of a power transmission waveform to calculate the presence probability of the foreign object. In a case where the foreign object is present near the power transmission apparatus 102 and the power reception apparatus 101, energy loss occurs due to the foreign object, and the Q factor decreases. Thus, the power transmission apparatus 102 is able to calculate the presence probability of the foreign object based on the ratio or the difference between the Q factor of a case where the foreign object is present and the Q factor of a case where the foreign object is not present. Alternatively, the power transmission apparatus 102 can calculate the presence probability of the foreign object based on the amount of change in the voltage value or the current value per predetermined time, or can calculate the presence probability by combining two or more values. The present disclosure is not limited to this. As described above, by using a different foreign object detection technique or combining a plurality of foreign object detection techniques, the power transmission apparatus 102 is able to calculate the presence probability of the foreign object with higher accuracy and achieve the wireless power transmission system 100 which is safer.

In a case where the presence probability of the foreign object is less than the first and second thresholds, and the reception power value is not greater than the predetermined proportion relative to the maximum reception power value of the calibration curve 1102, the power transmission apparatus 102 returns ACK and does not notify the power reception apparatus 101 of foreign object detection information. Even in this case, however, the power transmission apparatus 102 can notify the power reception apparatus 101 of foreign object detection information. With this configuration, even in a case where the presence probability of the foreign object is low, the power transmission apparatus 102 is able to periodically notify the power reception apparatus 101 of information regarding foreign object detection.

In the first and second exemplary embodiments, information about a request to start a process contained in foreign object detection information is a request on the basis of continuation of the transmission and reception of power, such as additional execution or re-execution of the calibration, but may be, for example, a request to reduce the reception power or stop reception of power. In this process, in a case where the presence probability of the foreign object calculated by the foreign object detection process is high, the power transmission apparatus 102 transmits foreign object detection information containing the information about the request to the power reception apparatus 101. Thus, in a case where the presence probability of the foreign object is high, the power transmission apparatus 102 is able to reduce or stop transmission and reception of power more reliably and achieve the wireless power transmission system 100 which is safer.

In the first and second exemplary embodiments, after the foreign object detection process, the power transmission apparatus 102 performs a notification of foreign object detection information. Alternatively, the power transmission apparatus 102 can perform a notification of foreign object detection information at another timing. In this process, in a case where the foreign object detection process is not performed, or the presence probability of the foreign object is unknown, the power transmission apparatus 102 can perform a notification of foreign object detection information with the information about the presence probability of the foreign object being a particular value (e.g., 0). Alternatively, the power transmission apparatus 102 can perform a notification of information about a request for a start of a process as a particular value (e.g., 0xFF). The present disclosure is not limited to this. In a case where, on the other hand, the power reception apparatus 101 receives foreign object detection information indicating that the foreign object detection process is not performed, or the presence probability of the foreign object is unknown, the power reception apparatus 101 can perform control not to increase the reception power, the power transmission output, or the GP above a predetermined value (or decrease the reception power, the power transmission output, or the GP to a predetermined value). Thus, the power reception apparatus 101 is able to prevent the transmission and reception of power with high output in the state where the foreign object detection process is not performed, i.e., the state where the possibility that the foreign object is present is not able to be denied.

In a case where the presence probability of the foreign object is greater than or equal to the second threshold, the power transmission apparatus 102 includes information about a request for re-execution of the calibration in foreign object detection information and in a case where the presence probability of the foreign object is smaller than the second threshold, the power transmission apparatus 102 includes information about a request for additional execution of the calibration in foreign object detection information. The power transmission apparatus 102, however, may include opposite information in foreign object detection information.

Each of a power reception apparatus and a power transmission apparatus can have the function of executing an application other than a wireless charging application. An example of the power reception apparatus is an information processing terminal, such as a smartphone. An example of the power transmission apparatus is an accessory device for charging the information processing terminal. For example, the information terminal device includes a display unit (a display) to which power received from a power reception coil (an antenna) is supplied and which displays information to a user. The power received from the power reception coil is stored in a power storage unit (a battery), and the battery supplies power to the display unit. In this case, the power reception apparatus may include a communication unit that communicates with another apparatus different from the power transmission apparatus. The communication unit may be compatible with a communication standard, such as near-field communication (NFC) or the fifth generation mobile communication system (5G). In this case, the communication unit may perform communication by the battery supplying power to the communication unit. Alternatively, the power reception apparatus can be a tablet terminal or a storage device, such as a hard disk device or a memory device, or can be an information processing apparatus, such as a personal computer (PC). Yet alternatively, for example, the power reception apparatus can be an imaging apparatus (a camera or a video camera). Yet alternatively, the power reception apparatus can be an image input apparatus, such as a scanner, or can be an image output apparatus, such as a printer, a copying machine, or a projector. Yet alternatively, the power reception apparatus can be a robot or a medical device. The power transmission apparatus can be an apparatus for charging the above devices.

Yet alternatively, the power transmission apparatus can be a smartphone. In this case, the power reception apparatus can be another smartphone, or may be wireless earphones.

Yet alternatively, the power reception apparatus according to the present exemplary embodiment can be a vehicle, such as an automobile or an automated guided vehicle (AGV). For example, the automobile as the power reception apparatus can be an automobile that receives power from a charger (the power transmission apparatus) via a power transmission antenna installed in a parking lot. Alternatively, the vehicle as the power reception apparatus can be a vehicle that receives power from a charger (the power transmission apparatus) via a power transmission coil (an antenna) embedded in a road or a traveling path. Power received by such a vehicle is supplied to a battery. The power in the battery may be supplied to a motor unit (a motor or an electric-powered unit) that drives wheels, or may be used to drive a sensor for use in driving assistance or drive a communication unit that communicates with an external apparatus. That is, in this case, the power reception apparatus may include a communication unit that communicates with the wheels, the battery, the motor or the sensor driven using received power, and further, an apparatus other than the power transmission apparatus. Further, the power reception apparatus can include an accommodation unit that accommodates a person. For example, examples of the sensor include a sensor for use in measuring the distance between vehicles or the distance from another obstacle. For example, the communication unit can be compatible with the Global Positioning System (Global Positioning Satellite, GPS). Alternatively, the communication unit can also be compatible with a communication standard, such as the fifth generation mobile communication system (5G). Alternatively, the vehicle can be a bicycle or an automatic motorcycle. Alternatively, the power reception apparatus is not limited to a vehicle, and can be a moving object or a flying object including a motor unit that is driven using power stored in a battery.

Yet alternatively, the power reception apparatus according to the present exemplary embodiment can be a power tool or a household electrical appliance product. Each of these devices as the power reception apparatus can include a battery and a motor that is driven by reception power stored in the battery. Each of these devices can include a notification unit that gives a notification of the remaining amount of the battery. Each of these devices can include a communication unit that communicates with another apparatus different from the power transmission apparatus. The communication unit can be compatible with a communication standard, such as NFC or the fifth generation mobile communication system (5G).

The power transmission apparatus according to the present exemplary embodiment may be an in-vehicle charger that transmits power to a mobile information terminal device, such as a smartphone or a tablet compatible with wireless power transmission, inside an automobile. Such an in-vehicle charger may be provided anywhere in the automobile. For example, the in-vehicle charger can be installed in a console of the automobile, or may be installed in an instrument panel (an IP or a dashboard), at a position between seats for passengers, on a ceiling, or on a door. The in-vehicle charger, however, should not be installed at a location where the in-vehicle charger interferes with driving. Although an example has been described where the power transmission apparatus is an in-vehicle charger, such a charger is not limited to a charger placed in a vehicle, and can be installed in transportations, such as a train, an aircraft, and a vessel. The charger in this case may also be installed at a position between seats for passengers, on a ceiling, or on a door.

Alternatively, a vehicle, such as an automobile, including an in-vehicle charger can be the power transmission apparatus. In this case, the power transmission apparatus includes wheels and a battery and supplies power to the power reception apparatus via a power transmission circuit unit and a power transmission coil (an antenna) using power in the battery.

The present disclosure can also be realized by processing in which a program for realizing one or more functions of the above-described embodiments is supplied to a system or an apparatus via a network or a storage medium and one or more processors in a computer of the system or the apparatus read and execute the program, and can also be realized by a circuit (for example, an ASIC) for realizing one or more functions.

It should be noted that the above-described embodiments are merely specific examples for implementing the present disclosure, and the technical scope of the present disclosure is not to be interpreted in a limited manner by these embodiments.

The present disclosure is not limited to the above-described embodiments, and various changes and modifications may be made without departing from the spirit and scope of the present disclosure, and accordingly, the following claims are appended to make the scope of the present disclosure public.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

A power transmission apparatus is able to appropriately transmit information based on a presence probability of an object different from a power reception apparatus to the power reception apparatus.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A power transmission apparatus comprising:
a power transmission unit configured to wirelessly transmit power to a power reception apparatus;
an acquisition unit configured to acquire information about a parameter;
a determination unit configured to determine a presence probability of a foreign object based on the acquired information; and
a transmission unit configured to transmit, to the power reception apparatus, first information about the presence probability of the foreign object and second information about a request for a process related to reacquisition of the parameter in a case where the presence probability of the foreign object is smaller than a threshold, and transmit, to the power reception apparatus, the first information without the second information in a case where the presence probability of the foreign object is greater than the threshold.

2. The power transmission apparatus according to claim 1, wherein in a case where the presence probability of the foreign object is greater than a first threshold, the transmission unit transmits the first information without the second information,
wherein in a case where the presence probability of the foreign object is smaller than the first threshold and greater than a second threshold, the transmission transmits the first information and the second information and
wherein in a case where the presence probability of the foreign object is smaller than the second threshold, the transmission unit transmits the first information and third information about a request for a process related to additional acquisition of the parameter.

3. The power transmission apparatus according to claim 2, wherein the parameter is a reception power value of the power reception apparatus,
wherein in a case where the presence probability of the foreign object is smaller than the second threshold, and the reception power value of the power reception apparatus is greater than a first reception power value, the transmission unit transmits the first information and the third information, and
wherein in a case where the presence probability of the foreign object is smaller than the second threshold, and the reception power value of the power reception apparatus is smaller than the first reception power value, the transmission unit does not transmit the first information.

4. The power transmission apparatus according to claim 2, wherein in a case where a state where the presence probability of the foreign object is smaller than the first threshold and greater than the second threshold continues for a time, the transmission unit transmits the second information.

5. The power transmission apparatus according to claim 1, wherein the parameter is a reception power value of the power reception apparatus.

6. A power reception apparatus comprising:
a power receiving unit configured to wirelessly receive power from a power transmission apparatus, the power reception apparatus;
a reception unit configured to receive from the power transmission apparatus first information about a presence probability of a foreign object; and
a control unit configured to perform, in a case where the presence probability of the foreign object is greater than a first threshold, control to stop reception of power, and perform, in a case where the presence probability of the foreign object is smaller than the first threshold and second information about a request for a process related to reacquisition of a parameter is received, the process related to reacquisition of the parameter.

7. The power reception apparatus according to claim 6, wherein in a case where the presence probability of the foreign object is smaller than the first threshold and greater than a second threshold, and the second information, the control unit performs the process related to reacquisition of the parameter, and
wherein in a case where the presence probability of the foreign object is smaller than the first threshold and greater than the second threshold, and the second information is not received, the control unit performs control to decrease reception power.

8. The power reception apparatus according to claim 7, wherein in a case where the presence probability of the foreign object is smaller than the second threshold, and third information about a request for a process related to additional acquisition of the parameter, the control unit executes the process related to additional acquisition of the parameter.

9. The power reception apparatus according to claim 6, wherein the parameter is a reception power value of the power reception apparatus.

10. A method for a power transmission apparatus that wirelessly transmits power to a power reception apparatus, the method comprising:
acquiring information about a parameter;
determining a presence probability of a foreign object based on the acquired information; and
transmitting, to the power reception apparatus, first information about the presence probability of the foreign object and second information about a request for a process related to reacquisition of the parameter in a case where the presence probability of the foreign object is smaller than a threshold,
transmitting, to the power reception apparatus, the first information without the second information in a case where the presence probability of the foreign object is greater than the threshold.

11. A method for a power reception apparatus that wirelessly receives power from a power transmission apparatus, the method comprising:
receiving from the power transmission apparatus first information about a presence probability of a foreign object; and
performing, in a case where the presence probability of the foreign object is greater than a first threshold, control to stop reception of power, and
performing, in a case where the presence probability of the foreign object is smaller than the first threshold and second information about a request for a process related to reacquisition of a parameter is received, the process related to reacquisition of the parameter.

12. A non-transitory computer-readable storage medium storing a program that causes a computer to perform a method for a power transmission apparatus that wirelessly transmits power to a power reception apparatus, the method comprising:
acquiring information about a parameter;
determining a presence probability of a foreign object based on the acquired information; and
transmitting, to the power reception apparatus, first information about the presence probability of the foreign object and second information about a request for a process related to reacquisition of the parameter in a case where the presence probability of the foreign object is smaller than a threshold,
transmitting, to the power reception apparatus, the first information without the second information in a case where the presence probability of the foreign object is greater than the threshold.

13. A non-transitory computer-readable storage medium storing a program that causes a computer to perform a method for a power reception apparatus that wirelessly receives power from a power transmission apparatus, the method comprising:
receiving from the power transmission apparatus first information about a presence probability of a foreign object; and
performing, in a case where the presence probability of the foreign object is greater than a first threshold, control to stop reception of power, and
performing, in a case where the presence probability of the foreign object is smaller than the first threshold and second information about a request for a process related to reacquisition of a parameter is received, the process related to reacquisition of the parameter.

* * * * *